(12) United States Patent
Miao et al.

(10) Patent No.: US 12,461,410 B2
(45) Date of Patent: Nov. 4, 2025

(54) COLOR FILM SUBSTRATE, METHOD FOR PREPARING THE SAME AND DISPLAY PANEL

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Wei Miao, Beijing (CN); Jianyun Xie, Beijing (CN); Yezhou Fang, Beijing (CN); Fengguo Wang, Beijing (CN); Bo Wang, Beijing (CN); Zhen Shi, Beijing (CN); Yongsheng Li, Beijing (CN); Jing Sun, Beijing (CN); Kai Chen, Beijing (CN); Shilong Zhang, Beijing (CN); Lei Gao, Beijing (CN); Yaozu Liu, Beijing (CN); Yuanhang Yang, Beijing (CN); Guojiang Yu, Beijing (CN)

(73) Assignees: Ordos Yuansheng Optoelectronics Co., Ltd., Inner Mongolia (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/263,985

(22) PCT Filed: Aug. 31, 2022

(86) PCT No.: PCT/CN2022/116258
§ 371 (c)(1),
(2) Date: Aug. 2, 2023

(87) PCT Pub. No.: WO2024/045061
PCT Pub. Date: Mar. 7, 2024

(65) Prior Publication Data
US 2025/0035975 A1 Jan. 30, 2025

(51) Int. Cl.
G02F 1/1335 (2006.01)
G02F 1/1362 (2006.01)
G02F 1/1368 (2006.01)

(52) U.S. Cl.
CPC .. *G02F 1/133514* (2013.01); *G02F 1/133512* (2013.01); *G02F 1/136209* (2013.01); *G02F 1/1368* (2013.01)

(58) Field of Classification Search
CPC ......... G02F 1/133512; G02F 1/133514; G02F 1/136209
See application file for complete search history.

(56) References Cited

U.S. PATENT DOCUMENTS

| 2014/0168585 A1 | 6/2014 | Huang et al. |
| 2017/0192143 A1 | 7/2017 | Xiong et al. |
| 2019/0227371 A1* | 7/2019 | Kawamura ....... G02F 1/136286 |

FOREIGN PATENT DOCUMENTS

| CN | 103033978 A | 4/2013 |
| CN | 103235439 A | 8/2013 |

(Continued)

*Primary Examiner* — Paisley L Wilson
(74) *Attorney, Agent, or Firm* — Raj S. Dave; Dave Law Group LLC

(57) ABSTRACT

Embodiments of the present disclosure provide a color film substrate and a method for preparing the same, and a display device. The color film substrate comprises a substrate; a first black matrix located on the substrate; and a second black matrix partially overlapping with the first black matrix, wherein at an overlapping position of the first black matrix and the second black matrix, the second black matrix overlays the first black matrix in a direction perpendicular to the substrate, and wherein a size of an opening defined by either of the first black matrix and the second black matrix is larger than a size of an opening defined by the first black matrix and the second black matrix together.

11 Claims, 16 Drawing Sheets

(56) References Cited

FOREIGN PATENT DOCUMENTS

| | | | |
|---|---|---|---|
| CN | 203149249 U | | 8/2013 |
| CN | 104166269 A | | 11/2014 |
| CN | 104834124 A | | 8/2015 |
| CN | 105487333 A | | 4/2016 |
| CN | 106547141 A | | 3/2017 |
| CN | 107024794 A | | 8/2017 |
| CN | 108681141 A | | 10/2018 |
| CN | 109739030 A | | 5/2019 |
| CN | 111487803 A | | 8/2020 |
| JP | 2009157034 A | | 7/2009 |
| JP | 2014145924 A | * | 8/2014 |

* cited by examiner

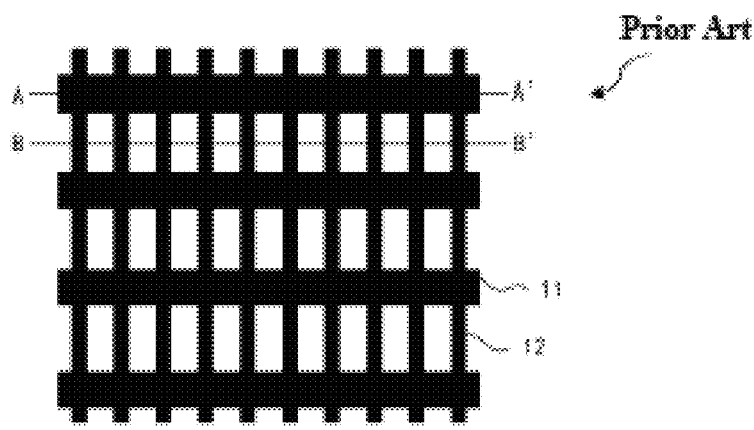
FIG. 1A — Prior Art
FIG. 1B — Prior Art
FIG. 1C — Prior Art
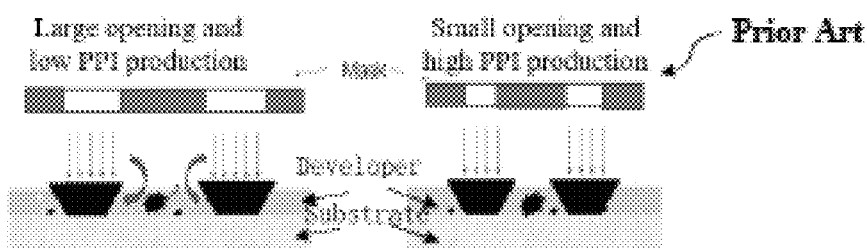
FIG. 2A    FIG. 2B — Prior Art
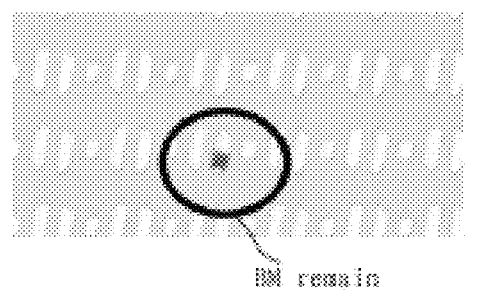
FIG. 2C — Prior Art Sharp corner is larger, and there is color mixing of B and G when viewed from side Sharp corner is smaller, and there is no color mixing of B and G when viewed from side

COLOR FILM SUBSTRATE, METHOD FOR PREPARING THE SAME AND DISPLAY PANEL

CROSS-REFERENCES TO RELATED APPLICATIONS

This patent application is a National Stage Entry of PCT/CN2022/116258 filed on Aug. 31, 2022, the disclosure of which is incorporated by reference herein in its entirety as part of the present application.

FIELD

The present disclosure relates to the field of display technology, and in particular to a color film substrate, a method for preparing a color film substrate, and a display panel.

BACKGROUND

The development of display panel industry has promoted the wide application in the field of electronic products, such as computers, TVs, cell phones, digital cameras, video cameras, mobile multimedia, advertising displays, etc. In the information era, display panels have become the core power of the electronic industry. In order to obtain better user experience, the PPI (pixels per inch) of the display panel has also been increasing. Especially with the arrival of the meta-universe era, ultra-high PPI products are increasingly favored by consumers.

BRIEF DESCRIPTION

Embodiments of the present disclosure provide a color film substrate and a method for preparing the same, and a display panel.

According to an aspect of the present disclosure, a color film substrate is provided, which may include a substrate; a first black matrix located on the substrate; and a second black matrix partially overlapping with the first black matrix, wherein at an overlapping position of the first black matrix and the second black matrix, the second black matrix overlays the first black matrix in a direction perpendicular to the substrate, and wherein a size of an opening defined by either of the first black matrix and the second black matrix is larger than a size of an opening defined by the first black matrix and the second black matrix together.

In some embodiments of the present disclosure relating to the color film substrate, an orthographic projection of the first black matrix on the substrate and an orthographic projection of the second black matrix on the substrate together form a grid pattern.

In some embodiments of the present disclosure relating to the color film substrate, the first black matrix may include at least a plurality of first black matrix strips extending in a first direction, and the second black matrix may include at least a plurality of second black matrix strips extending in a second direction different from the first direction and intersecting with the plurality of first black matrix strips, and wherein the overlapping position of the first black matrix and the second black matrix may comprise an intersection position of the plurality of first black matrix strips and the plurality of second black matrix strips.

In some embodiments of the present disclosure relating to the color film substrate, a spacing between two adjacent first black matrix strips of the plurality of first black matrix strips may be less than a spacing between two adjacent second black matrix strips of the plurality of second black matrix strips, and wherein a width of each first black matrix strip may be less than a width of each second black matrix strip.

In some embodiments of the present disclosure relating to color film substrates, a thickness of the first black matrix may be greater than a thickness of a portion of the second black matrix that overlaps with the first black matrix, but less than a thickness of a portion of the second black matrix that does not overlap with the first black matrix.

In some embodiments of the present disclosure relating to the color film substrate, the thickness of the first black matrix is in a range of 0.9-1.1 µm; the thickness of the position of the second black matrix that overlaps with the first black matrix is in a range of 0.5-0.6 µm; and the thickness of the position of the second black matrix that does not overlap with the first black matrix is in the range of 1.1-1.3 µm.

In some embodiments of the present disclosure relating to the color film substrate, the second black matrix may further include a plurality of third black matrix strips extending in the first direction and intersecting with the plurality of second black matrix strips, and wherein the plurality of third black matrix strips may be arranged dispersedly among the plurality of first black matrix strips such that there is at least one first black matrix strip between two adjacent third black matrix strips.

In some embodiments of the present disclosure relating to the color film substrate, the plurality of third black matrix strips and the plurality of first black matrix strips may be arranged alternately such that there is one first black matrix strip between two adjacent third black matrix strips.

In some embodiments of the present disclosure relating to the color film substrate, a distance between the first black matrix strip and the third black matrix strip adjacent thereto may be less than a distance between two adjacent second black matrix strips, and wherein the first black matrix strip and the third black matrix strip may have substantially the same width and their width is less than a width of the second black matrix strip.

In some embodiments of the present disclosure relating to the color film substrate, the first black matrix may further comprise a plurality of fourth black matrix strips extending in the second direction and intersecting with the plurality of first black matrix strips, and wherein the plurality of fourth black matrix strips may be arranged dispersedly among the plurality of second black matrix strips such that there may be at least one second black matrix strip between two adjacent fourth black matrix strips.

In some embodiments of the present disclosure relating to the color film substrate, the plurality of fourth black matrix strips and the plurality of second black matrix strips may be alternatively arranged such that there may be one second black matrix strip between two adjacent fourth black matrix strips.

In some embodiments of the present disclosure relating to the color film substrate, the fourth black matrix strip and the second black matrix strip may have substantially the same width and their width is greater than the width of the first black matrix strip.

In some embodiments of the present disclosure relating to the color film substrate, the first black matrix may include a plurality of first black matrix strips extending in a first direction and a plurality of fourth black matrix strips extending in a second direction different from the first direction, and the second black matrix may include a plurality of third black matrix strips extending in the first direction, and wherein the plurality of third black matrix strips and the plurality of first black matrix strips may be arranged alternately such that there is one first black matrix strip between two adjacent third black matrix strips.

In some embodiments of the present disclosure relating to the color film substrate, a thickness of a portion of the second black matrix that overlaps with the first black matrix may be less than a thickness of a portion of the second black matrix that does not overlap with the first black matrix.

In some embodiments of the present disclosure relating to the color film substrate, the color film substrate may further comprise a color resist layer, which may include a first color resist, a second color resist and a third color resist arranged alternately in the second direction in sequence.

In some embodiments of the present disclosure relating to the color film substrates, the second black matrix is in direct contact with the first black matrix at the overlapping position of the second black matrix and the first black matrix, and wherein the second black matrix may be coplanar with the first black matrix at the non-overlapping position of the first black matrix and the second black matrix.

In some embodiments of the present disclosure relating to the color film substrate, at least one of the first black matrix and the second black matrix may include a plurality of black matrix strips extending in the first direction, the color resist layer may be located in the opening defined by the first black matrix and the second black matrix together and overlapping at least partially with the plurality of black matrix strips in the direction perpendicular to the substrate.

In some embodiments of the present disclosure relating to the color film substrate, an intermediate layer is provided between the first black matrix and the second black matrix at the overlapping position, wherein the intermediate layer may include the color resist layer.

In some embodiments of the present disclosure relating to the color film substrate, at least one of the first black matrix and the second black matrix may include a plurality of black matrix strips extending in the first direction, the color resist layer may fill the opening defined by the first black matrix and overlap at least partially with the plurality of black matrix strips in the direction perpendicular to the substrate.

In some embodiments of the present disclosure relating to the color film substrate, an overlap between adjacent color resists of the first color resist, the second color resist and the third color resist may be zero, but a margin is allowed.

In some embodiments of the present disclosure relating to the color film substrate, the margin may be in the range of −0.6 µm to +0.6 µm.

In another aspect of the present disclosure, there is provided a base for use in preparing the color film substrate in one or more embodiments of the present disclosure, the base may include an overlap detection mark configured to detect an overlap deviation between one of the first color resist, the second color resist and the third color resist and the plurality of black matrix strips and between adjacent color resists of the first color resist, the second color resist and the third color resist.

In some embodiments of the present disclosure relating to the base, the overlap detection mark may include: a first reference mark adapted to detect an overlap deviation of the first color resist with respect to the first black matrix; a first detection mark adapted to compare its position with a position of the first reference mark in order to determine the overlap deviation of the first color resist with respect to the first black matrix; a second reference mark adapted to detect overlap deviations of the second color resist with respect to the first color resist and of the third color resist with respect to the first color resist; a second detection mark adapted to compare its position with a position of the second reference mark in order to determine the overlap deviation of the second color resist with respect to the first color resist; a third reference mark adapted to detect an overlap deviation of the third color resist with respect to the second color resist; and a third detection mark adapted to compare its position with positions of the second reference mark and the third reference mark in order to determine the overlap deviations of the third color resist with respect to the first color resist and the second color resist.

In some embodiments of the present disclosure relating to the base, the first reference mark is formed of the same material as the first black matrix; the first detection mark and the second reference mark are formed of the same material as the first color resist; the second detection mark and the third reference mark are formed of the same material as the second color resist; and the third detection mark is formed of the same material as the third color resist.

In some embodiments of the present disclosure relating to the base, the first reference mark, the second reference mark, and the third reference mark are shaped as hollow rectangles, the first detection mark, the second detection mark, and the third detection mark are shaped as solid rectangles, and the first detection mark, the second detection mark, and the third detection mark are located within the first reference mark, the second reference mark, and the third reference mark respectively.

In yet another aspect of the present disclosure, there is provided a display panel which may include: a color film substrate which may include a first substrate and a first black matrix located on the first substrate and including a plurality of first black matrix strips extending along a first direction, and an array substrate which may include a second substrate and a second black matrix located on the second substrate and including a plurality of second black matrix strips extending along a second direction different from the first direction, wherein an orthographic projection of the first black matrix on the first substrate and an orthographic projection of the second black matrix on the first substrate together form a grid pattern.

In some embodiments of the present disclosure relating to the display panel, the array substrate may further include a plurality of thin film transistors on a side of the second black matrix away from the second substrate, wherein orthographic projections of active layers of the plurality of thin film transistors on the second substrate may be within orthographic projections of the plurality of second black matrix strips on the second substrate such that the plurality of second black matrix strips are multiplexed as first shading portions to block light from being incident on the active layers.

In some embodiments of the present disclosure relating to the display panel, the color film substrate may further include a color resist layer, the color resist layer may be located in an opening defined by the first black matrix and overlap at least partially with the plurality of first black matrix strips in a direction perpendicular to the color film substrate.

In some embodiments of the present disclosure relating to the display panel, the color resist layer may include a first color resist, a second color resist and a third color resist, wherein an overlap between adjacent color resists of the first color resist, the second color resist and the third color resist is 0, but a margin is allowed.

In some embodiments of the present disclosure relating to the display panel, the color film substrate may further include a plurality of spacers configured to space the color film substrate and the array substrate apart, and the array substrate further includes a plurality of tabs configured to be rest on by one or more of the plurality of spacers, wherein orthographic projections of the plurality of tabs on the second substrate is within the orthographic projections of the plurality of second black matrix strips on the second substrate.

In some embodiments of the present disclosure relating to the display panel, each of the plurality of second black matrix strips at least includes at least one first segment having a first width in the first direction, at least one second segment having a second width in the first direction, and at least one third segment having a third width in the first direction, wherein the first width is greater than the second width, and the second width is greater than the third width.

In some embodiments of the present disclosure relating to the display panel, an orthographic projection of the at least one first segment on the second substrate overlaps with the orthographic projections of the plurality of tabs on the second substrate, and each first segment spans in the second direction two adjacent color resists of the color resist layer, wherein each second segment spans in the second direction one color resist of the color resist layer, the one color resist being one of the two adjacent color resists, and wherein each first segment of one of the two adjacent second black matrix strips is aligned in the first direction with two second segments of the other of the two adjacent second black matrix strips, and wherein each third segment spans in the second direction another color resist of the color resist layer, the another color resist being different from the two adjacent color resists, and wherein the third segment of one of the two adjacent second black matrix strips is aligned with the two adjacent color resistances, and wherein the third segment of one of the two adjacent black matrix strips is aligned in the first direction with the third segment of the other of the two adjacent black matrix strips.

In some embodiments of the present disclosure relating to the display panel, each second black matrix strip of the plurality of second black matrix strips further has a fourth segment between adjacent second segments, the fourth segment having a fourth width substantially equal to 0 μm in the first direction.

In some embodiments of the present disclosure relating to the display panel, the array substrate further includes: a plurality of first electrodes located on a side of the plurality of thin film transistors away from the second substrate and electrically connected to the drain electrodes of the plurality of thin film transistors, respectively; a second electrode layer located on a side of the plurality of first electrodes away from the second substrate and electrically insulated from the plurality of first electrodes; and a plurality of second shading portions electrically in contact with the second electrode layer and extending in the first direction, wherein orthographic projections of the plurality of second shading portions on the second substrate overlaps with orthographic projections of the plurality of first black matrix strips on the second substrate, respectively.

In some embodiments of the present disclosure relating to the display panel, the second shading portions are located on a side of the second electrode layer away from the second substrate or on a side of the second electrode layer close to the second substrate.

In some embodiments of the present disclosure relating to the display panel, at least one of the plurality of second shading portions is disconnected at a position intersecting the plurality of first segments.

In yet another aspect of the present disclosure, another display panel is provided including a color film substrate described herein in accordance with one or more embodiments relating to a color film substrate.

In still another aspect of the present disclosure, a method for preparing the color film substrate described herein in accordance with one or more embodiments relating to a color film substrate is provided. The method may include: providing a base; forming the first black matrix on the base; and forming a second black matrix, wherein the second black matrix overlaps with the first black matrix, and at an overlapping position of the first black matrix and the second black matrix, the second black matrix overlays the first black matrix in a direction perpendicular to the base, and wherein a size of an opening defined by either of the first black matrix and the second black matrix is larger than a size of an opening defined by the first black matrix and the second black matrix together.

In an embodiment relating to the method for preparing a color film substrate, the second black matrix is in direct contact with the first black matrix at the overlapping position of the second black matrix and the first black matrix, wherein the first black matrix may be coplanar with the second black matrix at a non-overlapping position of the first black matrix and the second black matrix, wherein at least one of the first black matrix and the second black matrix may include a plurality of black matrix strips extending in a first direction, and wherein the method may further include forming a color resist layer on the first black matrix and the second black matrix such that the color resist layer is located in the opening defined by the first black matrix and the second black matrix together and overlaps at least partially with the plurality of black matrix strips in the direction perpendicular to the base.

In an embodiment relating to the method for preparing the color film substrate, an intermediate layer is provided between the first black matrix and the second black matrix at the overlapping position, wherein the intermediate layer may include a color resist layer, wherein at least one of the first black matrix and the second black matrix may include a plurality of black matrix strips extending in the first direction, and wherein, between forming the first black matrix and forming the second black matrix, the method may further include: forming the color resist layer on the first black matrix such that the color resist layer fills the opening defined by the first black matrix and overlaps at least partially with the plurality of black matrix strips in the direction perpendicular to the base.

In an embodiment relating to the method for preparing the color film substrate, the color resist layer may include a first color resist, a second color resist and a third color resist arranged alternately in the second direction, wherein forming the first black matrix on the base may include: forming the first black matrix and a first reference mark on the base, wherein the first reference mark may be adapted to detect an overlap deviation of the first color resist with respect to the first black matrix, wherein forming the color resist layer include: forming the first color resist, a first detection mark and a second reference mark, wherein the first detection mark is adapted to compare its position with a position of the first reference mark in order to determine the overlap deviation of the first color resist with respect to the first black matrix, and wherein the second reference mark is adapted to detect overlap deviations of the second color resist with respect to the first color resist and of the third color resist with respect to the first color resist; forming the second color resist, a second detection mark and a third reference mark, wherein the second detection mark is adapted to compare its position with a position of the second reference mark in order to determine the overlap deviation of the second color resist with respect to the first color resist, and the third reference mark is adapted to detect an overlap deviation of the third color resist with respect to the second color resist; and forming the third color resist and a third detection mark, wherein the third detection mark is adapted to compare its position with positions of the second reference mark and the third reference mark in order to determine the overlap deviations of the third color resist with respect to the first color resist and the second color resist.

In an embodiment relating to the method for preparing the color film substrate, the first reference mark may be formed of the same material as the first black matrix; the first detection mark and the second reference mark may be formed of the same material as the first color resist; the second detection mark and the third reference mark may be formed of the same material as the second color resist; and the third detection mark may be formed of the same material as the third color resist.

In an embodiment relating to the method for preparing the color film substrate, the first reference mark, the second reference mark and the third reference mark may be shaped as hollow rectangles, the first detection mark, the second detection mark and the third detection mark may be shaped as solid rectangles, and the first detection mark, the second detection mark and the third detection mark may be located in the first reference mark, the second reference mark, and the third reference mark, respectively.

Further aspects and areas of applicability will become apparent from the description provided herein. It should be understood that various aspects of this application may be implemented individually or in combination with one or more other aspects. It should also be understood that the description and specific examples herein are intended for purposes of illustration only and are not intended to limit the scope of the present application.

BRIEF DESCRIPTION OF THE DRAWINGS

The drawings described herein are for illustrative purposes only of selected embodiments and not all possible implementations, and are not intended to limit the scope of the present application.
In the Figures:

FIG. TA schematically illustrates a top view of a black matrix in the related art;

FIG. 1B and FIG. 1C schematically illustrate cross-sectional views along lines AA' and BB', respectively, of the black matrix of FIG. TA;

FIG. 2A is a schematic diagram of the exposure development process for the black matrix of a large opening and low PPI display panel;

FIG. 2B is a schematic diagram of the exposure development process for the black matrix of a small opening and high PPI display panel;

FIG. 2C schematically illustrates the BM remain in the opening of the black matrix of the small opening and high PPI display panel FIG. 3 schematically illustrates a plan view of a color film substrate in one or more embodiments of the present disclosure.

FIG. 1C schematically illustrates a diagram of a process for preparing the color film substrate in FIG. 11A FIG. 12 schematically illustrates an overlap detection mark in one or more embodiments of the present disclosure;

Corresponding reference numerals indicate corresponding parts or features throughout the several views of the drawings.

DETAILED DESCRIPTION

Figure 3:
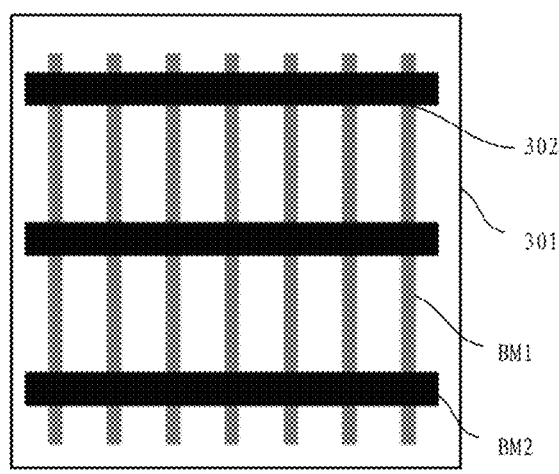

Various embodiments, which are provided as exemplary examples of the present disclosure, will now be described in detail with reference to the accompanying drawings to enable those skilled in the art to implement the present disclosure.

It should be noted that the following accompanying drawings and examples are not meant to limit the scope of the present disclosure. Where particular elements of the present disclosure may be partially or fully implemented using known components (or methods or processes), only those parts of such known components (or methods or processes) that are necessary for an understanding of the present disclosure will be described, and the detailed descriptions of other parts of such known components will be omitted so as not to confuse the present disclosure. Further, various embodiments encompass present and future known equivalents to the components referred to herein by way of illustration.

As used herein and in the appended claims, the singular form of a word includes the plural, and vice versa, unless the context clearly dictates otherwise. Thus, when referring to the singular, it is generally inclusive of the plurals of the respective terms. Similarly, the terms "comprise", "include", "contain" and "have" as well as grammatical variants thereof are intended to be inclusive and indicate that additional elements may be present in addition to those listed. Where the term "example" is used herein, particularly when it follows a group of terms, the "example" is merely exemplary and illustrative, and should not be deemed to be exclusive or comprehensive.

As used herein, the term "be located on" does not refer to a specific geometric orientation of the final stack in the color film substrate or the display panel with respect to a direction of a gravitational force but rather indicates a way of manufacturing the stack, which, after manufacturing, could, in general, be placed in any geometric orientation, also such as turned upside down. The terms "first", "second", "third", etc. are used for descriptive purposes only and should not be construed to indicate or imply relative importance and order of formation.

The black matrix (BM) is one of the essential components of a display panel. The black matrix divides pixels in different rows and pixels in different columns by multiple rows of black matrix strips and multiple columns of black matrix strips intersecting vertically and horizontally to prevent color mixing among pixels and to obscure some components of the display panel that are not expected to be seen by the user, such as signal lines, spacers. FIG. TA schematically illustrates a top view of a black matrix in the related art; FIG. 1B and FIG. 1C schematically illustrate cross-sectional views along lines AA' and BB', respectively, of the black matrix in FIG. TA. As shown in FIG. TA, the black matrix includes a plurality of horizontal BMs 11 (which may extend in the same direction as the extension of the gate lines of the display panel, and thus may also be referred to as gate-oriented BMs) and a plurality of vertical BMs 12 (which may extend in the same direction as the extension of the data lines of the display panel, and thus may also be referred to as date-oriented BMs) intersecting vertically and horizontally. As shown in FIG. 1B and FIG. 1C, the transverse BM 11 and the longitudinal BM 12 have the same thickness. At the intersection position of transverse BM 11 and longitudinal BM 12, the transverse BM 11 and the longitudinal BM 12 share the same thickness, that is, the thickness of the black matrix is the same as that of the transverse BM 11 or the longitudinal BM 12.

In preparing such a black matrix, the pattern of the black matrix is usually formed integrally on the substrate by processes such as gluing, exposure, development, baking. However, as the PPI of the display panel increases, the opening size of the black matrix pattern becomes smaller and smaller, which leads to a relatively small development margin. Longer development time will cause the black matrix pattern to peel off, and shorter development time will cause BM Remain in the openings of the black matrix pattern.

It should be noted that the terms "transverse" and "longitudinal" herein are relative to the orientation of the display panel, and that if the orientation of the display panel rotates (e.g., by 90 degrees), the "transverse" and "longitudinal" are interchangeable, i.e., "transverse" may be changed to "longitudinal" and "longitudinal" may also be changed to "transverse".

FIG. 2A is a schematic diagram of the exposure development process for the black matrix of a large opening and low PPI display panel; FIG. 2B is a schematic diagram of the exposure development process for the black matrix of a small opening and high PPI display panel; and FIG. 2C schematically illustrates the BM remain in the opening of the black matrix of the small opening and high PPI display panel. As shown in FIG. 2A, for the large-opening and low PPI display panel, the opening size of the black matrix is relatively large and thus the BM material in the opening is easily carried out from the opening by the developer during the development process (as shown by the straight arrow in FIG. 2A). As shown in FIG. 2B, for the small opening and high PPI display panel, the opening size of the black matrix is small, and thus the BM material in the opening is not easily carried out from the opening by the developer during the development process, resulting in some BM material remaining in the opening and forming BM remain (as shown in FIG. 2C).

Take a 1200 PPI display panel as an example, the pixel size of the display panel is about 7.1 μm*21.3 μm, the width of the Date-oriented BM is about 3.0 μm, the width of the Gate-oriented BM is about 7.2 μm, and the opening size of the BM is 4.1 μm*14.1 μm. With this opening size, BM remain is unavoidable. Generally, the number of BM remains in a single panel is greater than 2, which causes a half-pixel dark spot defect rate, for example, greater than 10%, which may seriously affect the product yield.

Therefore, there is a need for a color film substrate, a method for preparing the color film substrate, and a display panel that enable to reduce or even eliminate BM remains.

In one or more embodiments of the present disclosure, a color film substrate is provided including a substrate; a first black matrix located on the substrate; and a second black matrix partially overlapping with the first black matrix. At an overlapping position of the first black matrix and the second black matrix, the second black matrix overlays the first black matrix. A size of an opening defined by either of the first black matrix and the second black matrix is larger than a size of an opening defined by the first black matrix and the second black matrix together.

As used herein, "opening" is a broad term and should be given a meaning that is ordinary and customary to one of ordinary skill in the art, and not limited to a special or customized meaning.

The term may refer to a closed region surrounded by the black matrix, or an open region defined by two black matrix strips extending in substantially the same or similar direction. In the latter case, the opening may correspond to the region between the two black matrix strips. Accordingly, the "size of an opening" may refer to the area of a closed region in the case where the opening is a closed region, or to the area of a region between the two black matrix strips in the case where the opening is an open region.

In one or more embodiments of the present disclosure, an orthographic projection of the first black matrix on the substrate and an orthographic projection of the second black matrix on the substrate may together form a grid pattern. The size of the opening defined by either of the first black matrix and the second black matrix may be larger than the size of the opening in the grid pattern.

In an embodiment of the present disclosure, the black matrix of the color film substrate may be formed by combining the first black matrix and the second black matrix having a larger opening size, rather than being formed integrally. In this way, when preparing the black matrix of the color film substrate, the first black matrix and the second black matrix may be prepared in two separate steps. Since the opening sizes of both the first black matrix and the second black matrix are larger than that of the resulting black matrix, it is not easy to have BM remains in the openings during the preparation of the first black matrix and the second black matrix, and thus, there are no BM remains (the black dot in the ellipse in FIG. 2B) in the openings of the resulting black matrix.

As used herein, the term "overlap" is a broad term and should be given a meaning that is ordinary and customary to one of ordinary skill in the art, and not limited to a special or customized meaning. The term specifically may refer to the case where element A is directly superimposed on element B with no interlayer therebetween, or to the case where element A is indirectly superimposed on element B with one or more interlayers therebetween. Similarly, the term "overlay" is a broad term and should be given a meaning that is ordinary and customary to a person of ordinary skill in the art, and not limited to a special or customized meaning. The term specifically may refer to the case where element A directly contacts element B, or to the case where element A indirectly contacts element B.

FIG. 3 schematically illustrates a plan view of a color film substrate in one or more embodiments of the present disclosure. As shown in FIG. 3, the color film substrate includes a substrate 301; a first black matrix BM1 located on the substrate 301, a second black matrix BM2 partially overlapped with the first black matrix BM1. The second black matrix BM2 overlays the first black matrix BM1 at the overlapping position 302 of the first black matrix BM1 and the second black matrix BM2. A size of an opening defined by either of the first black matrix BM1 and the second black matrix BM2 is larger than a size of an opening defined by the first black matrix BM1 and the second black matrix BM2 together.

The individual components of the color film substrate provided in the embodiments of the present disclosure are described in detail below with reference to the accompanying drawings.

First black matrix BM1 and second black matrix BM2

Figure 4A:
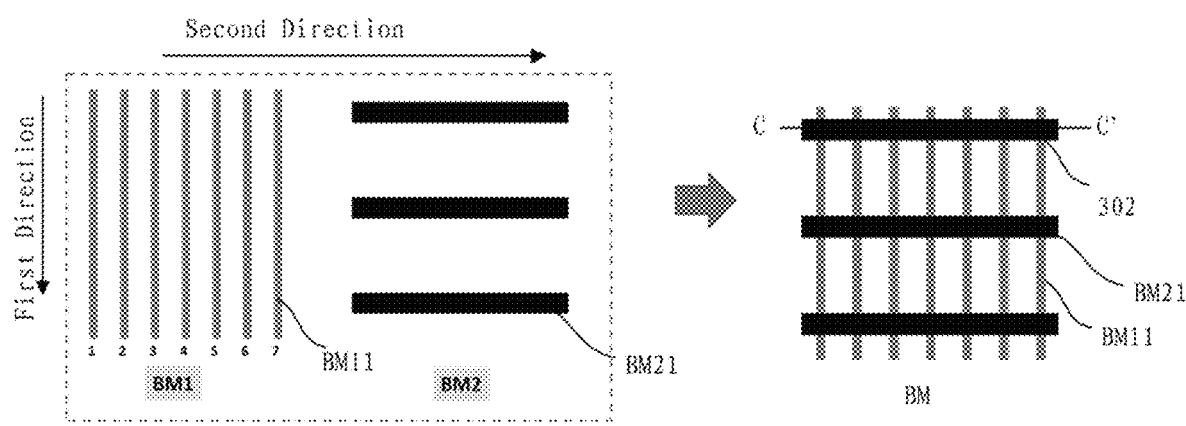
FIG. 4A schematically illustrates plan views of a first black matrix, a second black matrix, and a combined black matrix formed by the first black matrix and the second black matrix in an embodiment of the present disclosure.
Figure 4B:
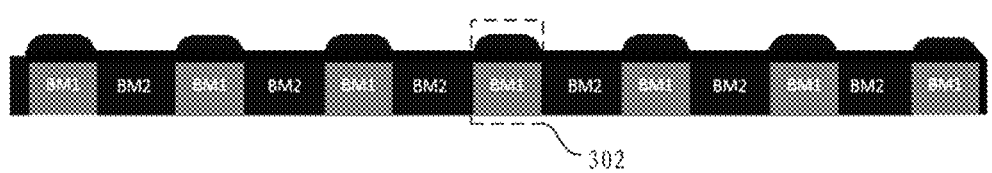
FIG. 4B schematically illustrates a cross-sectional view of the combined black matrix in FIG. 4A along the CC' line.

FIG. 4A schematically illustrates plan views of a first black matrix BM1, a second black matrix BM2, and a combined black matrix BM formed by the first black matrix BM1 and the second black matrix BM2 in an embodiment of the present disclosure; and FIG. 4B schematically illustrates a cross-sectional view of the combined black matrix BM along the CC' line in FIG. 4A.

As shown in FIG. 4A, the first black matrix BM1 may include a plurality of first black matrix strips BM11 extending in a first direction (illustrated as longitudinal in the accompanying drawings), and the second black matrix BM2 may include a plurality of second black matrix strips BM21 extending in a second direction (illustrated as transverse in the accompanying drawings).

The plurality of second black matrix strips BM21 each intersects with the plurality of first black matrix strips BM11. The overlapping position 302 of the first black matrix BM1 and the second black matrix BM2 may include an intersection position of the plurality of first black matrix strips BM11 and the plurality of second black matrix strips BM21. In one or more embodiments of the present disclosure, the second direction is perpendicular to the first direction.

As shown in FIG. 4B, the second black matrix BM2 may be superimposed directly on the first black matrix BM1 at the overlapping position 302 of the first black matrix BM1 and the second black matrix BM2, and the second black matrix BM1 may be coplanar with the first black matrix BM2 at the non-overlapping position of the first black matrix BM1 and the second black matrix BM2. The first black matrix BM1 and the second black matrix BM2 may form a combined black matrix BM having a thickness at the overlapping position 302 equal to a sum of the thicknesses of the first black matrix BM1 and the thickness of the second black matrix BM2 at that position, and a thickness at the non-overlapping position equal to the thickness of the corresponding one of the first black matrix BM1 and the second black matrix BM2.

In the embodiment, the openings defined by the first black matrix BM1 and the openings defined by the second black matrix BM2 are a plurality of open passages, so the area of these passages is generally larger. When preparing the black matrix, the first black matrix BM1 including a plurality of first black matrix strips BM11 extending longitudinally may be prepared first, followed by the second black matrix BM2 including a plurality of second black matrix strips BM21 extending transversely. In other words, when preparing the black matrix of the color film substrate, the longitudinal black matrix strips may be prepared first, followed by the transverse black matrix strips, and vice versa. Because the opening defined by any of the first black matrix BM1 and the second black matrix BM2 have a larger area and the BM material in the opening is more easily carried out from the opening by the developing solution during development, so the BM remains in the openings of the final formed black matrix BM may be eliminated.

In one or more embodiments of the present disclosure, the plurality of first black matrix strips BM11 of the first black matrix BM1 may extend in the same direction as the data signal lines of the display panel so that the first black matrix BM1 may obscure the data signal lines; and the plurality of second black matrix strips BM21 of the second black matrix BM2 may extend in the same direction as the gate signal lines of the display panel so that the second black matrix BM2 may obscure the gate signal lines.

With continued reference to FIG. 4A, a spacing between two adjacent first black matrix strips BM11 of the plurality of first black matrix strips BM11 may be smaller than a spacing between two adjacent second black matrix strips BM21 of the plurality of second black matrix strips BM21. In this case, the first black matrix strips BM11 with smaller spacings may be prepared first, with a flat bottom layer, and followed by the second black matrix strips BM21 with larger spacings on top of the first black matrix strips BM11, which is more helpful in eliminating the BM remains in the opening.

With continued reference to FIG. 4A, the width of each first black matrix strip BM11 may be smaller than the width of each second black matrix strip BM21. In an example embodiment, the width of the second black matrix strip BM21 may be 2-3 times the width of the first black matrix strip BM11. In a further example embodiment, the width of the first black matrix strip BM11 may be less than 3.0 microns and the width of the second black matrix strip BM21 may be greater than 6.0 microns. By reducing the width of the first black matrix strip BM11, a higher PPI may be achieved, while setting the width of the second black matrix strip BM21 to be greater than the width of the first black matrix strip BM11 may facilitate to subsequently prepare a spacer at a position corresponding to the second black matrix strip BM21.

In one or more embodiments of the present disclosure, the second black matrix BM2 may have a non-uniform thickness. As shown in FIG. 4B, the thickness of a portion of the second black matrix BM2 at the overlapping position with the first black matrix BM1 may be less than the thickness of a non-overlapping portion of the second black matrix BM2 with the first black matrix BM1. The fact that the thickness of the second black matrix BM2 is less than the thickness of the first black matrix BM1 at the overlapping position takes into account the fluidity of the ink forming the black matrix and allows the process to be easily achieved. In an exemplary embodiment, the thickness of the second black matrix BM2 at the overlapping portion may be about 0.4-0.6 microns, in particular, about 0.5 microns, and the thickness of the second black matrix BM2 at the non-overlapping portion may be about 1.1-1.3 microns, in particular, about 1.2 microns, in order to meet the requirement of the shading rate of the second black matrix BM2.

The inventor of the present disclosure has found that thinning the thickness of the first black matrix BM1 may improve the developing ability of the first black matrix BM1, thereby reducing the occurrence of BM remains. In one or more embodiments of the present disclosure, the thickness of the first black matrix BM1 may be greater than the thickness of a portion of the second black matrix BM2 overlapping with the first black matrix BM1, but may be less than the thickness of the position of the second black matrix BM2 that does not overlap with the first black matrix BM1. That is, the thickness of the first black matrix BM1 may be smaller than the thickness of the second black matrix BM2 except for the overlapping positions (where the second black matrix BM2 does not tend to have a larger thickness due to the fluidity of the ink).

However, the thickness of the first black matrix BM1 is also limited by the shading ratio of the first black matrix BM1. If the thickness is too thin, the black matrix's shading ratio may not be achieved. Typically, the black matrix used in the display panel needs to have a shading ratio greater than 4.0 to meet the shading requirements of the BM. The relationship among the thickness of the black matrix, the BM residual occurrence and BM shading rate is shown in Table 1.

TABLE 1

| Item | Normal | S1 | S2 | S3 | S4 |
|---|---|---|---|---|---|
| BM thickness | 50mj | 1.1 | 1.0 | 0.9 | 0.8 |
| BM residual occurrence | 3% | 2% | 1.5% | 0.8% | 0.6% |
| BM shading rate(specification > 4.0) | 4.6 | 4.3 | 4.1 | 3.8 | 3.6 |

As can be seen from Table 1 above, when the thickness of the first black matrix BM1 is reduced to less than 1.0 μm, the shading rate of the first black matrix BM1 will be less than 4.0. Therefore, in an embodiment of the present disclosure, the thickness of the first black matrix BM1 may be set to about 0.9-1.1 m, in particular about 1.0 m, which may not only facilitate the reduction of the occurrence rate of BM remain and but also ensure the shading rate of the first black matrix BM1.

Due to the large spacing between adjacent first black matrix strips of the plurality of second black matrix strips BM21 of the second black matrix BM2, the occurrence rate of BM remains is low and even BM remains almost non-existent during the development of the second black matrix BM2. Therefore, the second black matrix BM2 may have a larger thickness in order to ensure better shading. For example, the second black matrix BM2 may have a thickness of at least 1.2 μm in the non-overlapping portion.

Figure 5A:
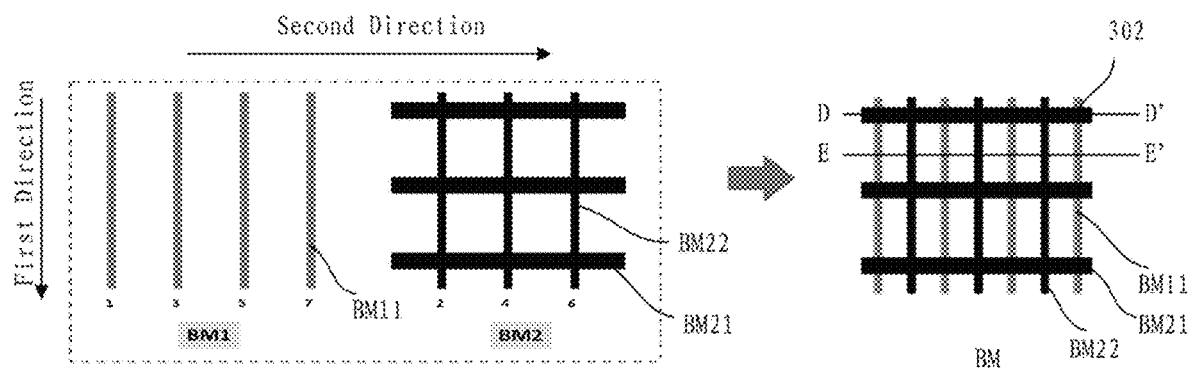
FIG. 5A schematically illustrates plan views of a first black matrix, a second black matrix, and a combined black matrix formed by the first black matrix and the second black matrix of another color film substrate in one or more embodiments of the present disclosure.
Figure 5B:
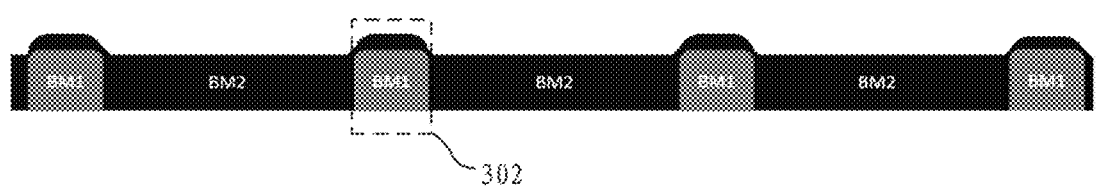
FIG. 5B schematically illustrates a cross-sectional view of the combined black matrix in FIG. 12A along the DD' line.
Figure 5C:
FIG. 5C schematically illustrates a cross-sectional view of the combined black matrix in FIG. 12A along the EE' line.

FIG. 5A schematically illustrates plan views of a first black matrix BM1, a second black matrix BM2, and a combined black matrix BM formed by the first black matrix BM1 and the second black matrix BM2 of another color film substrate in one or more embodiments of the present disclosure; FIG. 5B schematically illustrates a cross-sectional view of the combined black matrix BM in FIG. 5A along the DD' line; and FIG. 5C schematically illustrates a cross-sectional view of the combined black matrix BM in FIG. 5A along the EE' line.

As shown in FIG. 5A, the first black matrix BM1 may include a plurality of first black matrix strips BM11 extending in the first direction, and the second black matrix BM2 may include a plurality of second black matrix strips BM21 extending in the second direction and a plurality of third black matrix strips BM22 extending in the first direction and intersecting with the plurality of second black matrix strips BM21. In one or more embodiments of the present disclosure, the plurality of third black matrix strips BM22 may be arranged dispersedly among the plurality of first black matrix strips BM11 such that there is at least one first black matrix strip BM11 between two adjacent third black matrix strips BM22.

In some embodiments, the plurality of third black matrix strips BM22 may be alternately arranged with the plurality of first black matrix strips BM11 such that only one first black matrix strip BM11 may be present between two adjacent third black matrix strips BM22.

In one or more embodiments of the present disclosure, as shown in FIG. 5A, the first black matrix BM1 and the second black matrix BM2 may together form a combined black matrix BM having multiple columns of black matrix strips and multiple rows of black matrix strips. In an example embodiment, the first black matrix BM1 may include the 1st, 3rd, 5th, 7th . . . columns of black matrix strips (i.e., odd columns of black matrix strips) as the plurality of first black matrix strips BM11 of the first black matrix BM1, of the combined black matrix BM, and the second black matrix BM2 may include the 2nd, 4th, 6th . . . columns of black matrix strips (i.e., even columns of black matrix strips) as the plurality of third black matrix strips BM22 of the second black matrix BM2, of the combined black matrix and all rows of black matrix strips as the plurality of second black matrix strips BM21 of the second black matrix BM2.

In this way, when preparing the black matrix of the color film substrate, the first black matrix BM1 may be prepared on the substrate first. Since the first black matrix BM1 includes only odd columns of black matrix strips, the openings defined by the first black matrix BM1 are wider channels, much larger than the openings of the combined black matrix BM. When the pattern of the first black matrix BM1 is developed, the BM material in the openings is more easily carried out of the openings by the developing solution. Then, a second black matrix BM2 may be prepared, and since the second black matrix BM2 includes even columns of black matrix strips and all rows of black matrix strips, the openings defined by the second black matrix BM2 are also larger than the openings of the combined black matrix BM. When the pattern of the second black matrix BM2 is developed, BM remains are likewise facilitated to be eliminated. Thus, the combined black matrix BM formed from the first black matrix BM1 and the second black matrix BM2 together does not have BM remain.

In an alternative embodiment, the first black matrix BM1 may include the 1st, 2nd, 4th, 5th, 7th, 8th . . . columns of black matrix strips of the combined black matrix BM as the plurality of first black matrix strips BM11 of the first black matrix BM1, and the second black matrix BM2 may include the 3rd, 6th, 9th . . . columns of black matrix strips as the plurality of third black matrix strips BM22 of the second black matrix BM2 and all rows of black matrix strips of the combined black matrix BM as the plurality of second black matrix strips BM21 of the second black matrix BM2. In this way, the openings defined by each of the first black matrix BM1 and the second black matrix BM2 are larger than the openings of the combined black matrix BM formed by the first black matrix BM1 and the second black matrix BM2, so there is no BM remain in the combined black matrix BM.

In one or more embodiments of the present disclosure, as shown in FIGS. 5B and 5C, at the overlapping positions of the first black matrix BM1 and the second black matrix, the thickness of the combined black matrix may be equal to the sum of the thicknesses of the first black matrix BM1 and the second black matrix BM2, and at the non-overlapping positions of the first black matrix BM1 and the second black matrix BM2, the thickness of the combined black matrix is equal to the thickness of each of the first black matrix BM1 and the second black matrices BM2. At the non-overlapping positions of the first black matrix BM1 and the second black matrix BM2, the first black matrix BM1 and the second black matrix BM2 may be coplanar and have the same thickness, and at the overlapping positions of the first black matrix BM1 and the second black matrix, the thickness of the second black matrix BM2 is less than the thickness of the first black matrix BM1.

Figure 6A:
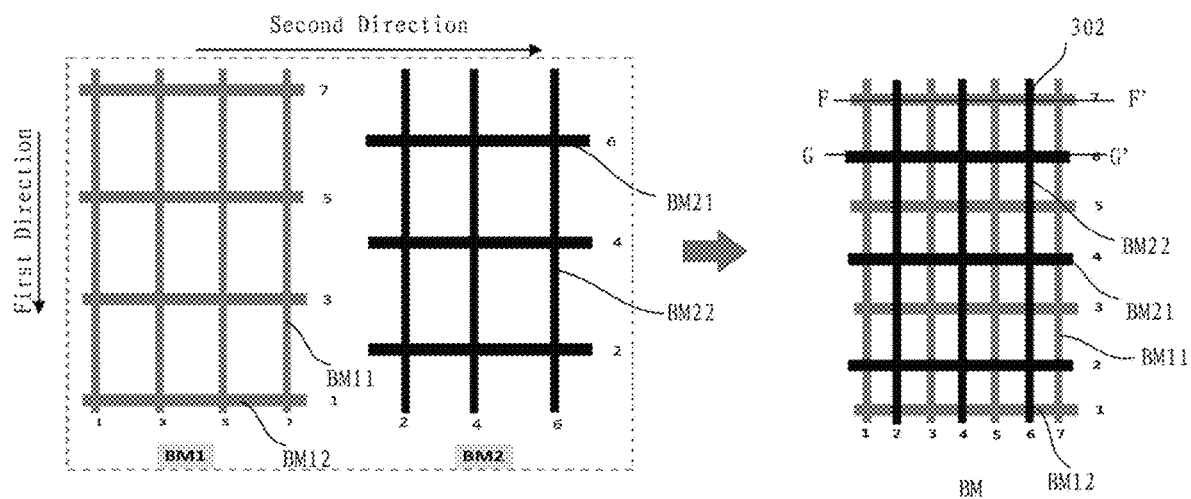
FIG. 6A schematically illustrates plan views of a first black matrix, a second black matrix, and a combined black matrix BM formed by the first black matrix and the second black matrix of yet another color film substrate in one or more embodiments of the present disclosure.
Figure 6B:
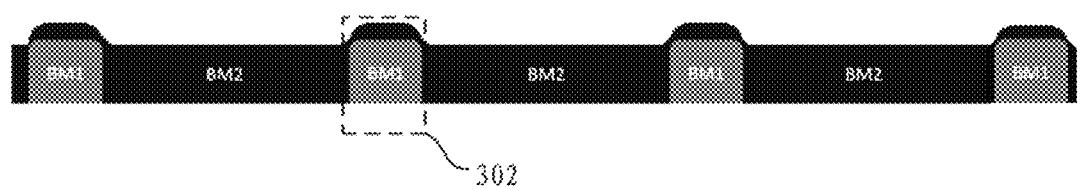
FIG. 6B schematically illustrates a cross-sectional view of the combined black matrix of FIG. 6A along the GG' line.
Figure 6C:
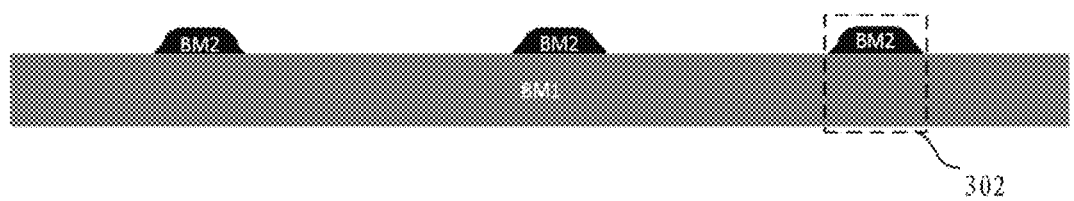
FIG. 6C schematically illustrates a cross-sectional view of the combined black matrix in FIG. 6A along line FF''.

FIG. 6A schematically illustrates plan views of a first black matrix BM1, a second black matrix BM2, and a combined black matrix BM formed by the first black matrix BM1 and the second black matrix BM2 of yet another color film substrate in one or more embodiments of the present disclosure; FIG. 6B schematically illustrates a cross-sectional view of the combined black matrix BM in FIG. 6A along the GG' line; FIG. 6C schematically illustrates a cross-sectional view of the combined black matrix BM in FIG. 6A along the FF' line.

In a non-limiting embodiment, as shown in FIG. 6A, the first black matrix BM1 may include a plurality of first black matrix strips BM11 extending in a first direction and a plurality of fourth black matrix strips BM12 extending in a second direction and intersecting with the plurality of first black matrix strips BM11, and the second black matrix BM2 may include a plurality of second black matrix strips BM21 extending in the second direction and a plurality of third black matrix strips BM22 extending in the first direction and intersecting with the plurality of second black matrix strips BM21. In one or more embodiments of the present disclosure, the plurality of third black matrix strips BM22 may be arranged dispersedly among the plurality of first black matrix strips BM11 such that there is at least one first black matrix strip BM11 between two adjacent third black matrix strips BM22; and the plurality of fourth black matrix strips BM12 are arranged dispersedly among the plurality of second black matrix strips BM21 such that there is at least one second black matrix strip BM21 between two adjacent fourth black matrix strips BM12.

In some embodiments, the plurality of third black matrix strips BM22 may be alternately arranged with the plurality of first black matrix strips BM11 such that only one first black matrix strip BM11 may be between two adjacent third black matrix strips BM22, and the plurality of fourth black matrix strips BM12 may be alternately arranged with the plurality of second black matrix strips BM21 such that only one second black matrix strip BM21 may be between two adjacent fourth black matrix strips BM12.

In one or more embodiments of the present disclosure, the first black matrix BM1 and the second black matrix BM2 may together form a combined black matrix BM with multiple columns of black matrix strips and multiple rows of black matrix strips. In an example embodiment, as shown in FIG. 6A, the first black matrix BM1 may include the 1st, 3rd, 5th, 7th . . . columns of black matrix strips (i.e., odd columns of black matrix strips) as the plurality of first black matrix strips BM11 of the first black matrix BM1, of the combined black matrix BM and the 1st, 3rd, 5th, 7th . . . rows of black matrix strips (i.e., odd rows of black matrix strips) as the plurality of fourth black matrix strips BM12 of the first black matrix BM1, of the combined black matrix BM, and the second black matrix BM2 may include the 2nd, 4th, 6th . . . columns of black matrix strips (i.e., even columns of black matrix strips) as the plurality of third black matrix strips BM22 of the second black matrix BM2 and the 2nd, 4th, 6th rows of black matrix strips (i.e., even rows of black matrix strips) as the plurality of second black matrix strips BM21 of the second black matrix BM2, of the combined black matrix BM. In this way, the openings defined by each of the first black matrix BM1 and the second black matrix BM2 are larger than the openings of the combined black matrix BM formed by the first black matrix BM1 and the second black matrix BM2, so there is no BM remain in the resulting combined black matrix BM.

As shown in FIGS. 6B and 6C, at the overlapping positions 302 of the first black matrix BM1 and the second black matrix BM2, the thickness of the combined black matrix BM may be equal to the sum of the thicknesses of the first black matrix BM1 and the second black matrix BM2, and at the non-overlapping positions of the first black matrix BM1 and the second black matrix BM2, the thickness of the combined black matrix BM is equal to the thickness of each of the first black matrix BM1 and the second black matrix BM2. At the non-overlapping positions of the first black matrix BM1 and the second black matrix BM2, the first black matrix BM1 and the second black matrix BM2 may be coplanar and have the same thickness, and at the overlapping positions 302 of the first black matrix BM1 and the second black matrix, the thickness of the second black matrix BM2 is less than the thickness of the first black matrix BM1.

In an alternative embodiment, the first black matrix BM1 may include the 1st, 2nd, 4th, 5th, 7th, 8th . . . columns of black matrix strips as the plurality of first black matrix strips BM11 of the first black matrix BM1, and the 3rd, 6th, 9th rows of black matrix strips as the plurality of fourth black matrix strips BM12 of the first black matrix BM1, of the combined black matrix BM, and the second black matrix BM2 may comprise the 3rd, 6th, 9th . . . columns of black matrix strips as the plurality of third black matrix strips BM22 of the second black matrix BM2, and the 1st, 2nd, 4th, 5th, 7th, 8th rows of black matrix strips as the plurality of second black matrix strips BM21 of the second black matrix BM2, of the combined black matrix BM. In this way, the openings defined by each of the first black matrix BM1 and the second black matrix BM2 are larger than the openings of the combined black matrix BM formed by the first black matrix BM1 and the second black matrix BM2, so there is no BM remain in the combined black matrix.

Figure 7A:
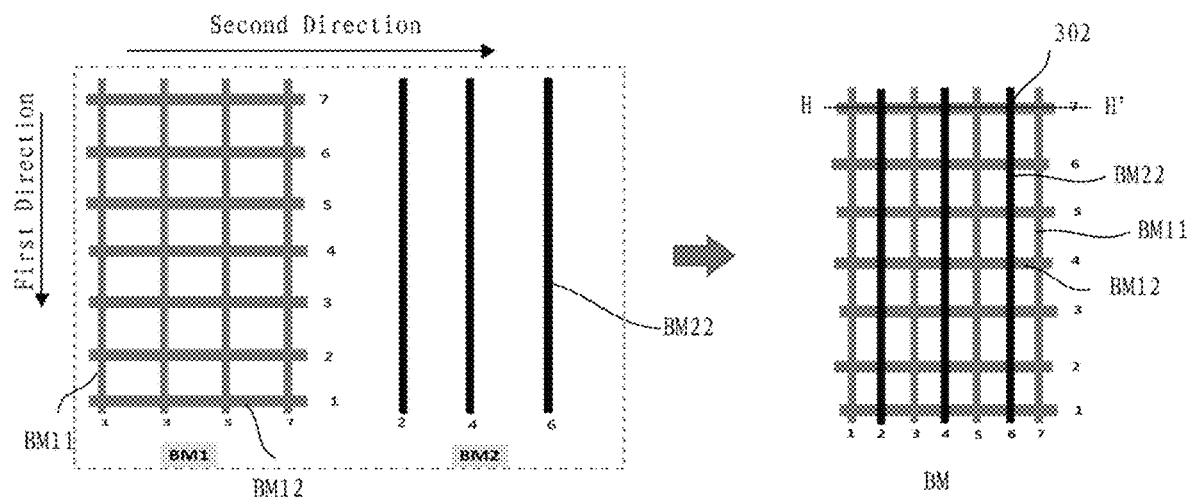
FIG. 7A schematically illustrates plan views of a first black matrix, a second black matrix, and a combined black matrix BM formed by the first black matrix and the second black matrix of still yet another color film substrate in one or more embodiments of the present disclosure.
Figure 7B:
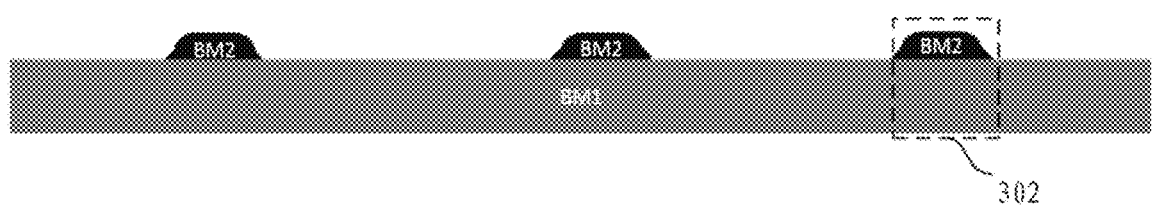
FIG. 7B schematically illustrates a cross-sectional view of the combined black matrix in FIG. 7A along the HH' line.

FIG. 7A schematically illustrates plan views of a first black matrix BM1, a second black matrix BM2, and a combined black matrix BM formed by the first black matrix BM1 and the second black matrix BM2 of still yet another color film substrate in one or more embodiments of the present disclosure; FIG. 7B schematically illustrates a cross-sectional view of the combined black matrix BM in FIG. 7A along the HH' line.

In a non-limiting embodiment, as shown in FIG. 7A, the first black matrix BM1 may include a plurality of first black matrix strips BM11 extending in a first direction and a plurality of fourth black matrix strips BM12 extending in a second direction and intersecting with the plurality of first black matrix strips BM11, and the second black matrix BM2 may include a plurality of third black matrix strips BM22 extending in the first direction. In one or more embodiments of the present disclosure, the plurality of third black matrix strips BM22 may be arranged dispersedly among the plurality of first black matrix strips BM11 such that there is at least one first black matrix strip BM11 between two adjacent third black matrix strips BM22.

In one or more embodiments, the plurality of third black matrix strips BM22 may be alternately arranged with the plurality of first black matrix strips BM11 such that only one first black matrix strip BM11 may be present between two adjacent third black matrix strips BM22.

In one or more embodiments of the present disclosure, the first black matrix BM1 and the second black matrix BM2 may together form a combined black matrix BM with multiple columns of black matrix strips and multiple rows of black matrix strips. In an example embodiment, as shown in FIG. 7A, the first black matrix BM1 may include the 1st, 3rd, 5th, 7th . . . columns of black matrix strips (i.e., odd columns of black matrix strips) as the plurality of first black matrix strips BM11 of the first black matrix BM1, and all rows of black matrix strips as the plurality of fourth black matrix strips BM12 of the first black matrix BM1, of the combined black matrix BM, and the second black matrix BM2 may include the 2nd, 4th, 6th . . . columns of black matrix strips (i.e., even columns of black matrix strips) as the plurality of third black matrix strips BM22 of the second black matrix BM2, of the combined black matrix BM. In this way, the openings defined by each of the first black matrix BM1 and the second black matrix BM2 are larger than the openings of the combined black matrix BM formed by the first black matrix BM1 and the second black matrix BM2, and thus there is no BM remain in the combined black matrix BM.

As in FIG. 7B, at the overlapping positions of the first black matrix BM1 and the second black matrix BM2, the thickness of the combined black matrix BM may be equal to the sum of the thicknesses of the first black matrix BM1 and the second black matrix BM2, and at the non-overlapping positions of the first black matrix BM1 and the second black matrix BM2, the thickness of the combined black matrix BM is equal to the thickness of each of the first black matrix BM1 and the second black matrix BM2. At the non-overlapping positions of the first black matrix BM1 and the second black matrix BM2, the first black matrix BM1 and the second black matrix BM2 may be coplanar and have the same thickness, and at the overlapping positions of the first black matrix BM1 and the second black matrix, the thickness of the second black matrix BM2 may be less than the thickness of the first black matrix BM1.

In an alternative embodiment, the first black matrix BM1 may include the 1st, 4th, 7th . . . columns of black matrix strips as the plurality of first black matrix strips BM11 of the first black matrix BM1, and all rows of black matrix strips as the plurality of fourth black matrix strips BM12 of the first black matrix BM1, of the combined black matrix BM, and the second black matrix BM2 may include the 2nd, 3rd, 5th, 6th, 8th, 9th . . . columns of black matrix strips as the plurality of third black matrix strips BM22 of the second black matrix BM2, of the combined black matrix BM. In this way, the openings defined by each of the first black matrix BM1 and the second black matrix BM2 are larger than the openings of the combined black matrix BM formed by the first black matrix BM1 and the second black matrix BM2, so there is no BM remain in the combined black matrix BM.

It is understood that in embodiments of the present disclosure, the arrangements of the first black matrix BM1 and the second black matrix BM2 are not limited to the embodiments described in detail above, and the purpose of the present disclosure may be achieved as long as the size of the openings of either of the first black matrix BM1 and the second black matrix BM2 is larger than the size of the openings of the resulting combined black matrix.

In one or more embodiments as already described above, the first black matrix BM1 and the second black matrix BM are in direct contact at the overlapping positions. However, in an alternative embodiment, the first black matrix BM1 and the second black matrix BM2 may not be in direct contact. In other words, an intermediate layer, such as a color resist layer, may be arranged between the first black matrix BM1 and the second black matrix BM2, as described in detail below.

Arrangement of the Color Resist Layer

In one or more embodiments of the present disclosure, the color film substrate 300 may further include a color resist layer. The color resist layer may include a first color resist, a second resister and a third color resist arranged alternately in the second direction and extending in the first direction. In an example embodiment, the first color resist may include a red filter layer, the second color resist may include a green filter layer, and the third color resist may include a blue filter layer.

In one or more embodiments of the present disclosure, particularly in the embodiments described with respect to FIGS. 4A to 7B, at least one of the first black matrix BM1 and the second black matrix BM2 includes a plurality of black matrix strips extending in the first direction (longitudinal black matrix strips). In such an embodiment, the color resist layer may be located in the openings defined by the first black matrix BM1 and the second black matrix BM2 together and may at least partially overlap in the direction perpendicular to the substrate with the plurality of black matrix strips.

Figure 8A:
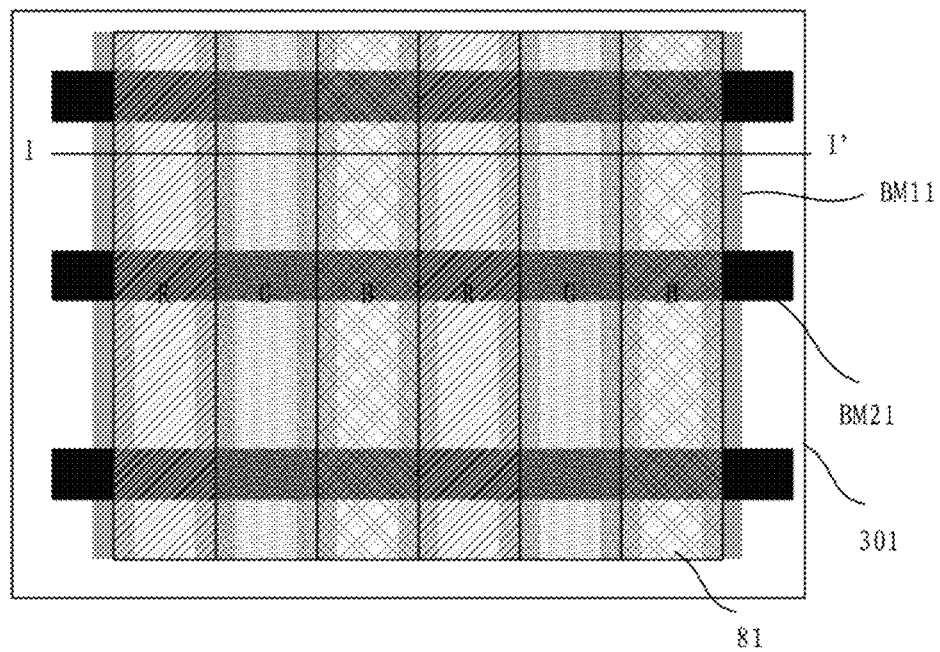
FIG. 8A schematically illustrates an arrangement of the color resist layer with respect to the black matrix in one or more embodiments of the present disclosure.
Figure 8B:
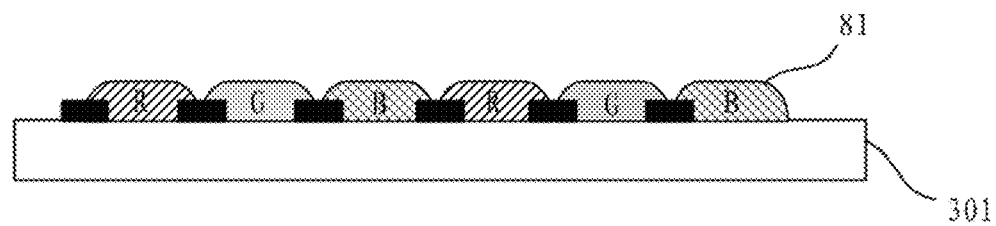
FIG. 8B schematically illustrates a cross-sectional view along line II' in FIG. 8A.

FIG. 8A schematically illustrates an arrangement of the color resist layer relative to the black matrix in one or more embodiments of the present disclosure; FIG. 8B schematically illustrates a cross-sectional view along lines I-I' in FIG. 8A. As shown in FIGS. 8A and 8B, the color resist layer 81 may include a first color resist R, a second color resist G, and a third color resist B. The first color resist R, the second color resist G, and the third color resist B may extend in the first direction and be arranged alternately in the second direction. The first color resist R, the second color resist G and the third color resist B may fill the openings defined by the combined black matrix BM formed by the first black matrix BM1 and the second black matrix BM2, and the first color resist R, the second color resist G and the third color resist B each extends in a width direction on the first black matrix strips BM11 located on both sides, that is, each of the first color resist R, the second color resist G and the third color resist B lap on the first black matrix strip BM11. In other words, the width of each of the first color resist R, the second color resist G and the third color resist B may larger than the opening defined by the adjacent first black matrix strips BM11 such that each of the first color resist R, the second color resist G and the third color resist B partially overlaps with the first black matrix strips BM11 neighboring thereto. With this configuration, light leakage in the vicinity of the first black matrix strips BM11 is prevented.

In one or more embodiments of the present disclosure, no spacing is arranged between adjacent color resists of the first color resist R, the second color resist G, and the third color resist B (for example, between R and G, between G and B, and between B and R). In other words, the first color resist R, the second color resist G and the third color resist B may completely overlay the first black matrix strip BM11 located therebetween.

To further prevent light leakage, the adjacent color resists of the first color resists R, the second color resists G and the third color resists B may have a certain degree of overlap (which may be expressed by the width of overlap) therebetween. Specifically, a certain degree of overlap may exist between the first color resist R and the second color resist G, between the second color resist G and the third color resist B, or between the third color resist B and the first color resist R.

However, for high PPI display panels, the size of the black matrix BM (in particular, the first black matrix strip BM11 of the first black matrix BM1) is usually relatively small. If the overlap between adjacent color resists is high, a sharp corner (also called Taper corner, caused by unevenness at the edges of adjacent color resists) at the adjoiner of the adjacent color resists are large, which may easily cause color shift and thus affect the display effect of the display panel.

In one or more embodiments of the present disclosure, the overlap between the adjacent color resist of the first color resist R, the second color resist G, and the third color resist B may be set to 0, but a certain margin may be allowed. In an example embodiment, the margin is 0-±0.6 µm. With this configuration, even if the overlap between adjacent color resists in the actual product is not 0 due to limitations in equipment accuracy, process conditions, etc., the overlap deviation within a predetermined range will not cause significant color shift and thus will not increase the defect rate of the product.

Figure 9A:
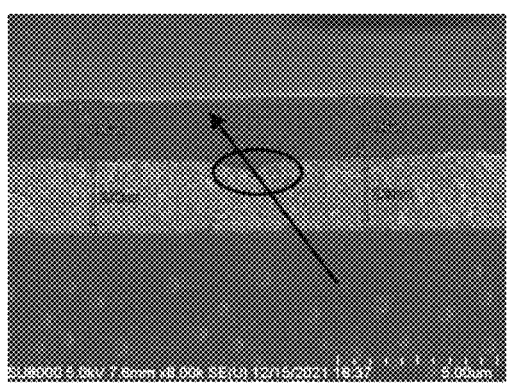
FIGS. 9A and 9B schematically illustrate electron microscope diagrams of sharp corners between adjacent color resists having a large degree of overlap and substantially no overlap, respectively.
Figure 9B:
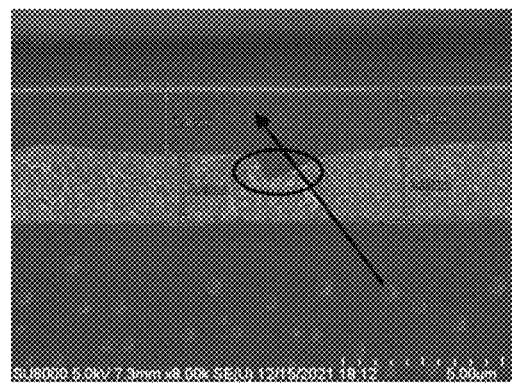

FIG. 9A and FIG. 9B illustrate electron microscope diagrams of sharp corners between adjacent color resists having a high degree of overlap and substantially no overlap, respectively.

Figure 10A:
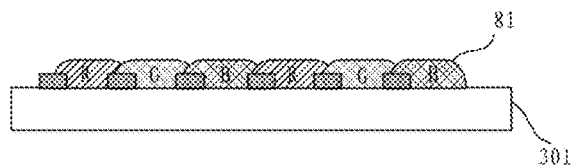
FIGS. 10A and 10B schematically illustrate cross-sectional views of color film substrates in the case of having a large degree of overlap between adjacent color resists and in the case of having substantially no overlap between adjacent color resists, respectively.
Figure 10B:
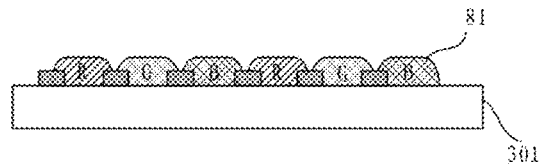

FIGS. 10A and 10B schematically illustrate cross-sectional views of color film substrates in the case of having a high degree of overlap between adjacent color resists and in the case of having substantially no overlap between adjacent color resists, respectively.

As shown in FIGS. 9A and 10A, in the case where there is a high overlap between adjacent color resists (for example, color resist B and color resist G), the Taper angle formed between the adjacent color resists is larger, the boundary of color resist B is biased toward the side of color resist G, and the boundary of color resist G is biased toward the side of color resist B. The color shift is easily observed when the display panel is viewed from the side. As shown in FIGS. 9B and 10B, in the case where there is substantially no overlap between adjacent color resists (for example, color resist B and color resist G), the Taper angle formed between the adjacent color resists is small, and both the boundary of color resist B and the boundary of color resist G are located substantially near the midline of the first black matrix strip BM11. The color shift is not observed when the display panel is viewed from the side.

In one or more embodiments of the present disclosure, even if the overlap between adjacent color resists is 0, this setting can meet the light leakage risk requirement according to the light leakage risk assessment. The light leakage risk in the case where the overlap between adjacent color resists is 0 is evaluated below.

The light leakage risk of the overlap between adjacent color resists may be evaluated by evaluating the light leakage margin. The light leakage margin used herein may represent a minimum overlap between each color resist and the neighboring black matrix strip that may satisfy the light leakage risk requirement, which is expressed by the overlap width between each color resist and the neighboring black matrix strip.

The light leakage margin may be related to the following parameters:
a. a dimensional margin of the black matrix strip δBM CD (for example, the first black matrix strip BM11), i.e., an accuracy of the width of the black matrix strip. Since each black matrix strip longitudinally extending overlaps with two neighboring color resists, the dimensional margin of the black matrix strip assigned to each neighboring color resist may be δBM CD/2. In the case of a black matrix strip with a width of 3.0 µm, the dimensional margin of the black matrix strip may be ±0.5 µm.
b. An overlap margin between the individual color resist and the neighboring black matrix strip δRGB OL, i.e., the accuracy of the overlap width of the individual color resist and the neighboring black matrix strip, which may be ±0.8 µm.
c. a dimensional margin of individual color resist δRGB CD, i.e., the accuracy of the width of individual color resist, which may be ±0.75 µm. Since each color resist overlaps with both left and right black matrix strips, the dimensional margin of each color resist assigned to each black matrix strip may be δRGB CD/2.
d. The Taper angle margin δTaper at the adjoiner of the adjacent color resists, which may be determined by the color resist thickness, the black matrix strip thickness, and the Taper angle. In the case of the color resist with a thickness of 2.7 µm, the black matrix strip with a thickness of 1.2 µm, and the Taper angle of 70° at the adjoiner of the adjacent color resists, the Taper angle margin is: (2.7-1.2)×Tan 30°=0.86 µm.

Light leakage margin may be calculated based on the above parameters:

$$\sqrt{(\delta_{BM\,CD}/2)^2 + (\delta_{RGB\,OL})^2 + (\delta_{RGB\,CD}/2)^2 + (\delta_{Taper})^2} = \sqrt{0.25^2 + 0.8^2 + 0.375^2 + 0.86^2} = 1.25 \ \mu m < 1.5 \mu m_°$$

From the above equation, it can be seen that the light leakage risk may be satisfied as long as the overlap between each color resist and the neighboring black matrix strip is not less than 1.25 µm. In the case where adjacent color resists are immediately adjacent to each other (i.e., completely cover the neighboring black matrix strip) but do not have an overlap therebetween, the overlap between a single color resist and the neighboring black matrix strip is 1.5 µm, thus satisfying the light leakage risk requirement.

Figure 11A:
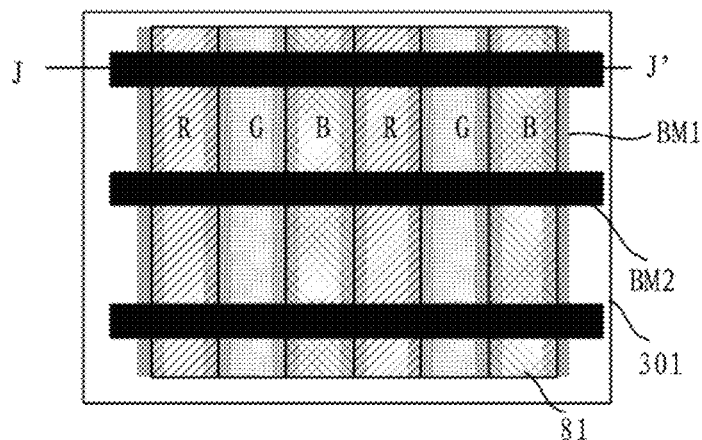
FIG. 11A schematically illustrates a plan view of still yet another color film substrate in one or more embodiments of the present disclosure, showing an alternative arrangement of the color resist layer with respect to the first black matrix BM1 and the second black matrix BM2.
Figure 11B:
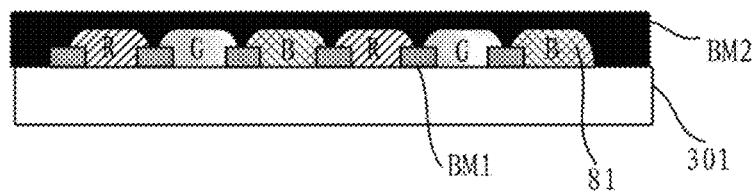
FIG. 11B illustrates a cross-sectional view along line JJ' of the color film substrate in FIG. 11A.
Figure 11C:
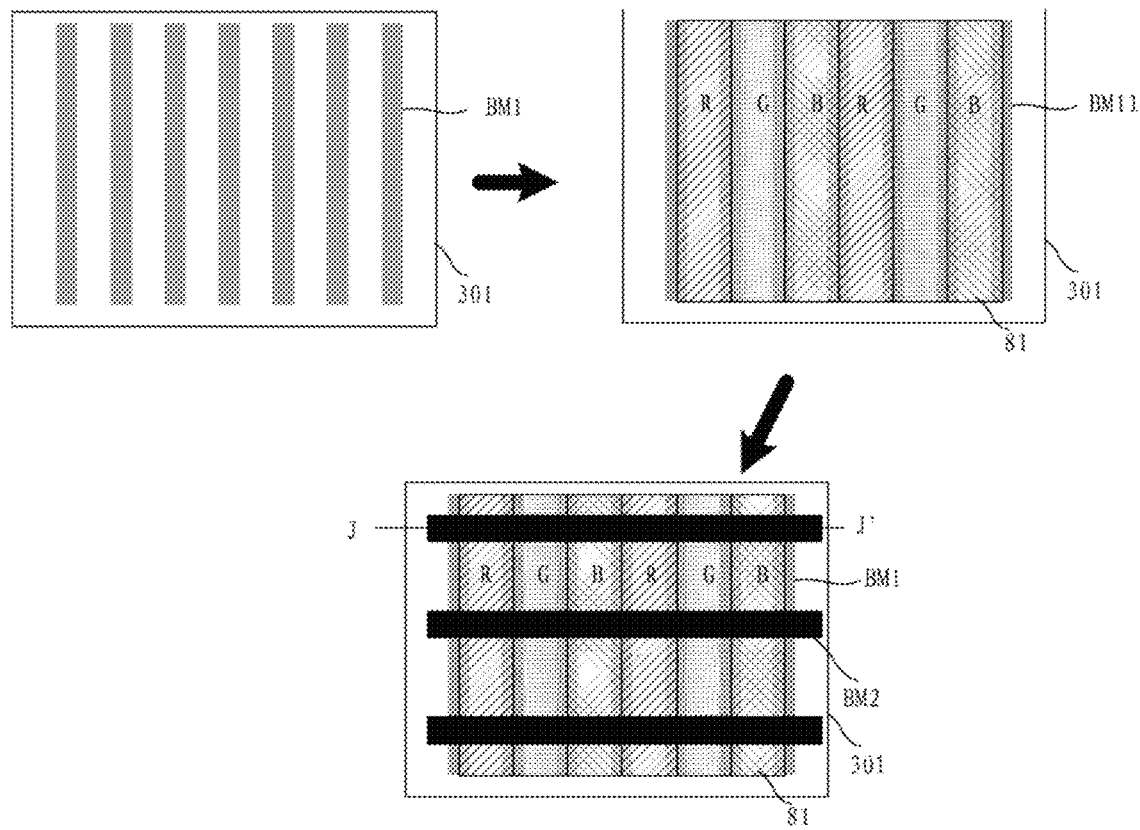

FIG. 11A schematically illustrates a plan view of still yet another color film substrate in one or more embodiments of the present disclosure, showing an alternative arrangement of the color resist layer relative to the first black matrix BM1 and the second black matrix BM2; FIG. 11B illustrates a cross-sectional view along line JJ' of the color film substrate in FIG. 11A; and FIG. 11C schematically illustrates a diagram of a process for preparing the color film substrate in FIG. 11A. As shown in FIGS. 11A and 11B, the color resist layer 81 may also be located between the first black matrix BM1 and the second black matrix BM2. In this embodiment, as shown in FIG. 11C, in preparing the color film substrate, the first black matrix BM1 may be formed on the substrate 301, followed by the color resist layer 81 on the first black matrix BM1, and then the second black matrix BM2 on the color resist layer 81.

The first black matrix BM1 and the second black matrix BM2 may have any of the above arrangements with respect to the embodiments shown in FIG. 4A to FIG. 7B. In this way, the first black matrix BM1 and the second black matrix BM2 are formed in two separate steps and the openings of both the first black matrix BM1 and the second black matrix BM2 are large, thereby facilitating the elimination of BM remains. In addition, forming the first black matrix BM1 and the second black matrix BM2 are formed on two separate layers respectively, which also helps to prevent color crosstalk between adjacent color resists.

It is understood that the order of arrangement of the first black matrix BM1, the second black matrix BM2, and the color resist layer 81 is not limited to the embodiment shown in FIG. 11. In an alternative embodiment, it is also possible to form the second black matrix BM2 on the substrate first, then form the color resist layer 81 on the second black matrix BM2, and finally form the first black matrix BM1.

In one or more embodiments of the present disclosure, the color film substrate may further include other components as desired such as a planarization layer located on the color resist layer, a spacer layer located on the planarization layer. These components are not described in detail herein, and the details of these components may refer to the relevant knowledge known to those skilled in the art.

In another aspect of the present disclosure, a base for use in preparation of the color film substrate in one or more of the embodiments described herein is further provided. In preparing the color film substrate in one or more embodiments described herein, at least one color film substrate may be prepared on the base (also referred to as a base layer). In the case where a single color film substrate is prepared on the base, the excess portion of the base other than the portion where the color film substrate is located may be cut off after the preparation is completed, thereby forming the color film substrate. In the case where a plurality of color film substrates are prepared on the base, the color film substrates on the base may be separated so that a plurality of individual color film substrates may be separated. The base may include an overlap detection mark configured to detect overlap deviations between one of the first color resist R, the second color resist G, and the third color resist B and a black matrix strip (which in this embodiment may be, for example, the first black matrix strip BM11) and between adjacent color resists of the first color resist R, the second color resist G, and the third color resist B. In one or more embodiments, the overlap detection mark may be arranged in an region of the base other than the region where the color film substrate is located. In this way, after the color film substrate is prepared, the region of the base occupied by the overlap detection mark may be cut off, so that the resulting color film substrate has no overlap detection mark.

During the preparation of color resist layer 81, after a color resist is prepared each time, it is usually necessary to check whether the position of the color resist reaches the standard by means of testing equipment. If not, the parameters of the equipment need to be adjusted so that each color resist is formed in a precise position. The position of the color resist may usually be detected by monitoring the overlap deviations between each of the first color resist R, the second color resist G and the third color resist B and the black matrix BM (in particular, the black matrix strip that extends in the same direction as the color resist) (i.e., between R and BM, between G and BM and between B and BM), respectively. If the overlap deviation is in the range of 0-±0.6 µm, the standard is considered to be met. There may be some problems with this. For example, if the first color resist R is shifted to the right by 0.5 µm and the second color resist G adjacent thereto is shifted to the left by 0.5 µm, a conclusion that the standard is met will be achieved by monitoring method. However, in practice, the relative position shift between the first color resist R and the second color resist G is large, which tends to cause color shift.

In one or more embodiments of the present disclosure, the overlap detection mark may be used to detect the overlap deviations between one of the first color resist R, the second color resist G and the third color resist B and the black matrix strip and between the adjacent color resists of the first color resist R, the second color resist G and the third color resist B, so that the positions of the first color resist R, the second color resist G and the third color resist B may be monitored more accurately, and thus the color shift phenomenon may be reduced.

In one or more embodiments of the present disclosure, the overlay detection mark may include a first reference mark adapted to detect the overlap deviation of the first color resist R with respect to the first black matrix BM1; a first detection mark adapted to compare its position with the position of the first reference mark in order to determine the overlap deviation of the first color resist R with respect to the first black matrix BM1; a second reference mark adapted to detect the overlap deviations of the second color resist G with respect to the first color resist R and of the third color resist B with respect to the first color resist R; a second detection mark, adapted to compare its position with the position of the second reference mark in order to determine the overlap deviation of the second color resist G with respect to the first color resist R; a third reference mark adapted to detect the overlap deviation of the third color resist B with respect to the second color resist G; and a third detection mark adapted to compare its position with the positions of the second reference mark and the third reference mark in order to determine the overlap deviations of the third color resist B with respect to the first color resist R and the second color resist G.

Figure 12:
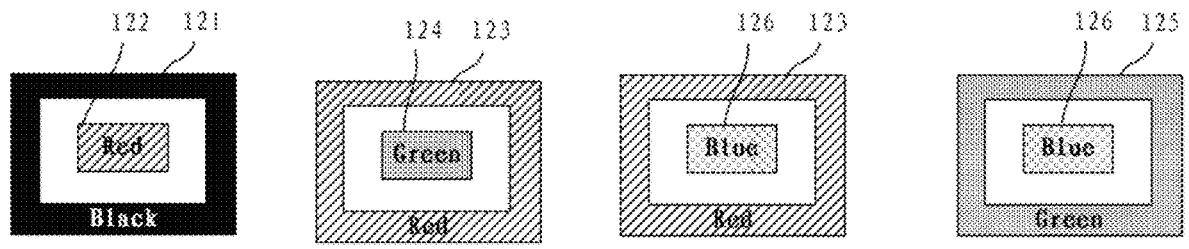

FIG. 12 schematically illustrates overlap detection marks in one or more embodiments of the present disclosure. As shown in FIG. 12, the overlap detection mark may include a first reference mark 121 that may be formed from the same material as the first black matrix BM1. In this way, the first reference mark 121 may be formed on the base together with the first black matrix BM1 when the first black matrix BM1 is formed. The overlap detection mark may further include a first detection mark 122 and a second reference mark 123, which may be formed from the same material as the first color resist R. In this way, both the first detection mark 122 and the second reference mark 123 may be formed on the base when the first color resist R is formed. After the first color resist R is formed, the overlap deviation between the first color resist R and the first black matrix strip BM11 may be determined, for example, by detecting the position deviation between the first detection mark 122 and the first reference mark 121 by a detection device. The overlap detection mark may further include a second detection mark 124 and a third reference mark 125, which may be formed from the same material as the second color resist G. In this way, both the second detection mark 124 and the third reference mark 125 may be formed on the base when the second color resist G is formed. After the second color-resist G is formed, the overlap deviation between the second color-resist G and the first color-resist R may be determined, for example, by detecting the position deviation between the second detection mark 124 and the second reference mark 123 by the detection device. The overlap detection mark may further include a third detection mark 126, which may be formed from the same material as the third color resist B.

In this way, the third detection mark 126 may be formed on the base when the third color resist B is formed. After the third color resist B is formed, the overlap deviations between the third color resist B and the first color resist R and between the third color resist B and the second color resist G may be determined, for example, by detecting the position deviations between the third detection mark 126 and the second reference mark 123 and between the third detection mark 126 and the third reference mark 125, respectively, by the detection device.

With continued reference to FIG. 12, the first reference mark 121, the second reference mark 123 and the third reference mark 125 are shaped as hollow rectangles, the first detection mark 122, the second detection mark 124 and the third detection mark 126 are shaped as solid rectangles, and the first detection mark 122, the second detection mark 124 and the third detection mark 126 are located in the first reference mark 121, the second reference mark 123, and the third reference mark 125, respectively. With this configuration, it is possible to determine the overlap deviations between color resists and between color resists and black matrix by determining the center position of these overlap detection marks, which facilitates easy and accurate detection of the overlap deviation.

Figure 13A:
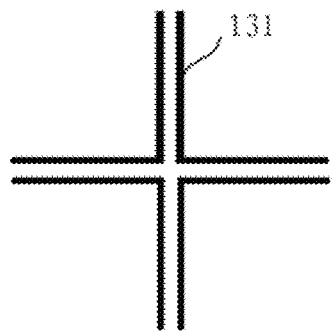
FIG. 13A schematically illustrates an alignment mark in one or more embodiments of the present disclosure.
Figure 13B:
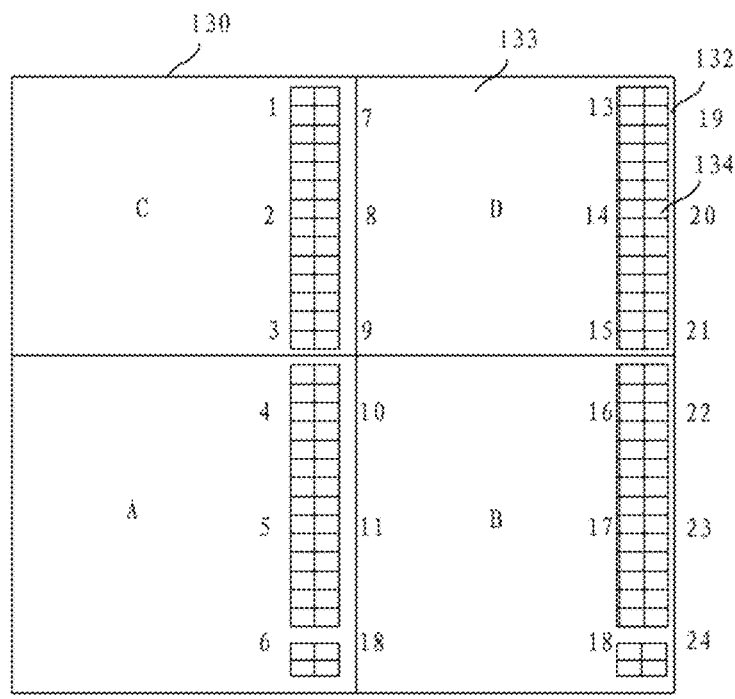
FIG. 13B schematically illustrates a distribution of alignment marks in one or more embodiments of the present disclosure.

In one or more embodiments of the present disclosure, corresponding alignment marks may be provided in an effective region of the base in order to accurately position the individual layers or components relative to each other when preparing the individual layers or components of the color film substrate (including the first black matrix BM1, the second black matrix BM2, the color resist layer, the planarization layer, the spacer layer, etc.). These alignment marks may be formed on the substrate when preparing the first black matrix BM1. FIG. 13A schematically illustrates an alignment mark in one or more embodiments of the present disclosure, and FIG. 13B schematically illustrates a distribution of alignment marks in one or more embodiments of the present disclosure. The alignment marks 131 may have a patterned shape shown in FIG. 13A. However, it will be understood by those skilled in the art that the pattern shape of the alignment mark 131 is not limited to that shown in FIG. 13A, and various shapes are contemplated by those skilled in the art. Typically, at the product technology development stage, a large base 130 may be divided into a plurality of sub-base regions (e.g., four regions A, B, C, D) as shown in FIG. 13B, each sub-base region being further divided into a load effective region 132 located at at least one edge of the sub-base region and a load ineffective region 133 other than the load effective region 132. As further shown in FIG. 13B a plurality of panel regions 134 (small rectangular regions in FIG. 13B) for preparing a display panel thereon may be designed on the load effective region 132, such as two columns of panel regions 134. Alignment marks may be provided on the perimeter of the display region. For the large base 130 as shown in FIG. 13B, four sets of alignment marks, six in each set, for a total of 24, may be provided on the perimeter of the panel regions 134 in the effective load region 133, and these alignment marks may be distributed, for example, at the locations marked by the numbers 1, 2, 3 . . . 24 in FIG. 13B.

It should be noted that the distribution of panel regions and the distribution of alignment marks illustrated in FIG. 13B is at the technology development stage of the product. at the mass production stage, the panel regions may be distributed over the entire large base region, while the alignment marks may be distributed in rows or columns on the perimeter of the panel regions.

Figure 14A:
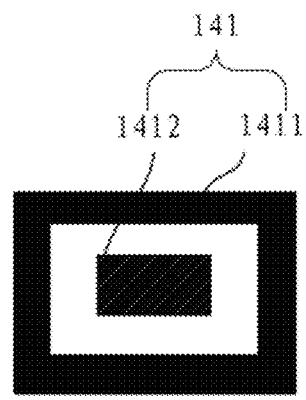
FIG. 14A schematically illustrates an alignment detection mark in one or more embodiments of the present disclosure.
Figure 14B:
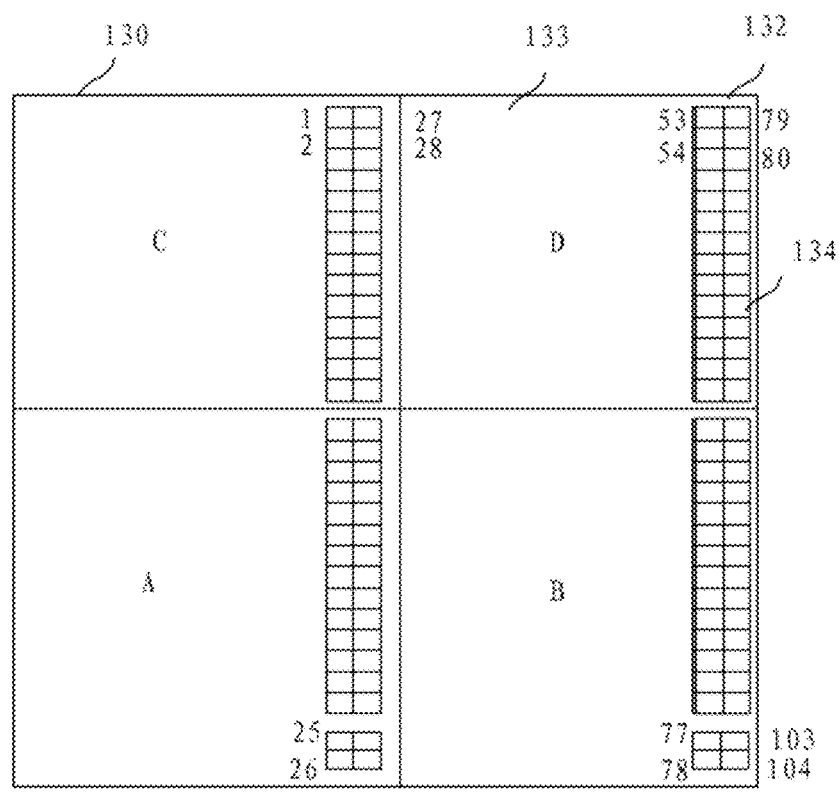
FIG. 14B schematically illustrates a distribution of alignment detection marks in one or more embodiments of the present disclosure.

After each layer is prepared, alignment deviations of relative positions between other layers may further be detected by other alignment detection marks in addition to the overlap detection marks described above. As an example, after the second black matrix BM2 is fabricated, the alignment deviation between the second black matrix BM2 and the first black matrix BM1 may be monitored by testing the offset of the black matrix alignment detection marks. FIG. 14A schematically illustrates an alignment detection mark in one or more embodiments of the present disclosure; and FIG. 14B schematically illustrates an distribution of the alignment detection marks in one or more embodiments of the present disclosure. As shown in FIG. 14A, the alignment detection mark 141 may have a similar shape to the overlap detection mark shown in FIG. 12. The alignment detection marks 141 may include a reference mark 1411 and a detection mark 1412 located within the reference mark 1411. However, it will be understood by those skilled in the art that the pattern shape of the alignment detection mark 141 is not limited to that shown in FIG. 14A, and various shapes may be contemplated by those skilled in the art.

As shown in FIG. 14B, these alignment detection marks 141 may likewise be distributed on the perimeter of the panel region in the load effective region 132. As an example, four sets of alignment detection marks 141, 26 in each set, for a total of 104, may be provided on the perimeter of the panel regions 134, and these alignment detection marks 141 may be distributed at the locations marked by the numbers 1, 2, 3 . . . 104 in FIG. 13B, for example.

It should be noted that the distribution of panel regions and the distribution of alignment detection marks illustrated in FIG. 14B is at the technology development stage of the product. At the mass production stage, the panel region may be distributed over the entire large base region, while the alignment detection marks may be distributed in rows or columns on the perimeter of the panel region.

In an embodiment of the present disclosure, similar to the control of the overlap between the color resists described above, the alignment deviation between the first black matrix BM1 and the second black matrix BM2 is also controlled with a margin of 0-±0.6 μm. In the case where the alignment deviation is outside this margin, the position of the second black matrix BM2 needs to be adjusted.

In yet another aspect of the present disclosure, a display panel is further provided. The display panel may include at least one color film substrate according to the present disclosure, such as at least one color film substrate according to one or more embodiments disclosed in more detail above and/or below. Thus, for optional embodiments of the display panel, reference may be made to embodiments of the color film substrate.

Figure 15:
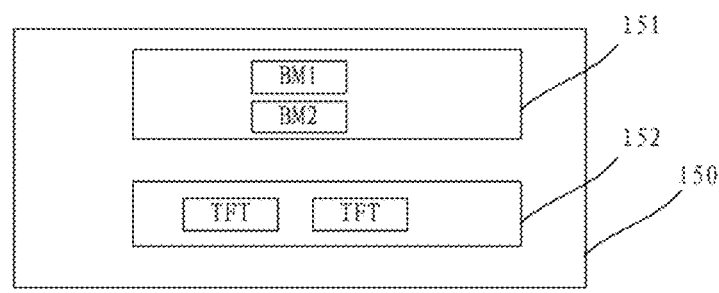
FIG. 15 schematically illustrates a block diagram of a display panel in one or more embodiments of the present disclosure.
Figure 16:
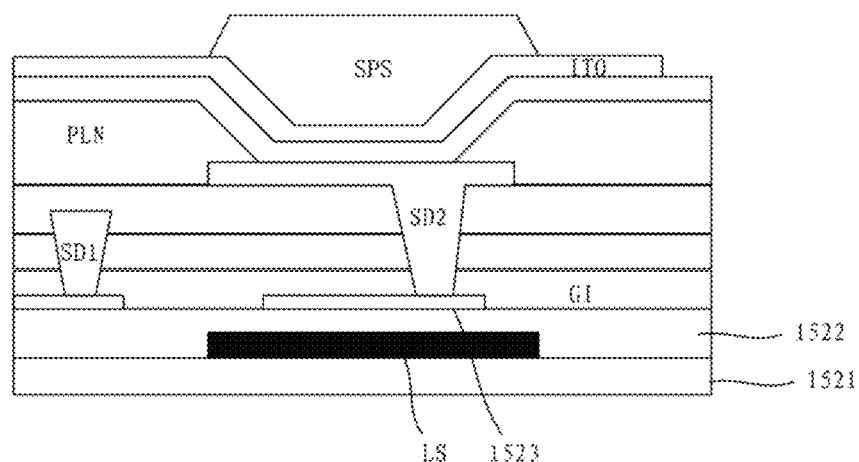
FIG. 16 schematically illustrates a cross-sectional view of an exemplary array substrate of the display panel shown in FIG. 15.

FIG. 15 schematically illustrates a block diagram of a display panel 150 in one or more embodiments of the present disclosure. As shown in FIG. 15, the display panel 150 may include a color film substrate 151 and an array substrate 152. In one or more embodiments of the present disclosure, the color film substrate 151 may include any of the color film substrates according to one or more of the embodiments described in detail earlier. The array substrate 152 may have any of the arrangements in the related art and the present disclosure is not particularly limited. FIG. 16 schematically illustrates a cross-sectional view of an exemplary array substrate 152 for the display panel shown in FIG. 15. As shown in FIG. 16, the array substrate 152 may include a second substrate 1521, a first shading portion LS located on the second substrate 1521, a buffer layer 1522 located on the first shading portion LS, a thin film transistor located on a side of the buffer layer 1522 away from the second substrate 1521, and may include an active layer 1523 and source/drain electrodes SD1, SD2. In this embodiment, the active layer 1523 of the thin film transistor and the source/drain electrodes SD1, SD2. In this embodiment, an orthographic projection of the active layer 1523 of the thin film transistor on the second substrate 1521 is within an orthographic projection of the first shading portion LS on the second substrate 1521 so that the first shading portion LS blocks light incident on the active layer 1623 and affects the effect of the active layer 1623. In the embodiment, the array substrate 152 may further include a gate insulating layer GI, a passivation layer PLN, an electrode ITO, and a plurality of tabs SPS. The plurality of tabs are configured to be rest on by one or more of the plurality of spacers located on the color film substrate.

The orthographic projections of the plurality of tabs SPS on the second substrate 1521 may be within the orthographic projections of the first shading portions LS on the second substrate so as to prevent light leakage at the tabs.

In some embodiments, each first shading portion LS may correspond to an active layer 1623 of a thin film transistor, and each first shading portion LS may have an area at least larger than the area of the corresponding active layer 1623 so as to be able to shade the active layer. Exemplarily, each first shading portion LS may be in the form of a block capable of shading the corresponding active layer. It is understood that each first shading portion LS may also alternatively shade the active layers of the thin film transistors on the same row, i.e., each first shading portion LS may be in the form of an elongated strip extending in the second direction.

In the embodiment of the display panel, both the first black matrix BM1 and the second black matrix BM2 are disposed on the color film substrate 151, and the size of the openings of the first black matrix BM1 and the second black matrix BM2 is larger than the size of the openings defined by the first black matrix BM1 and the second black matrix BM2 together, so that both the first black matrix BM1 and the second black matrix BM2 do not easily have BM remains therein, and thus the resulting combined black matrix also has no BM remain in the openings.

Figure 17:
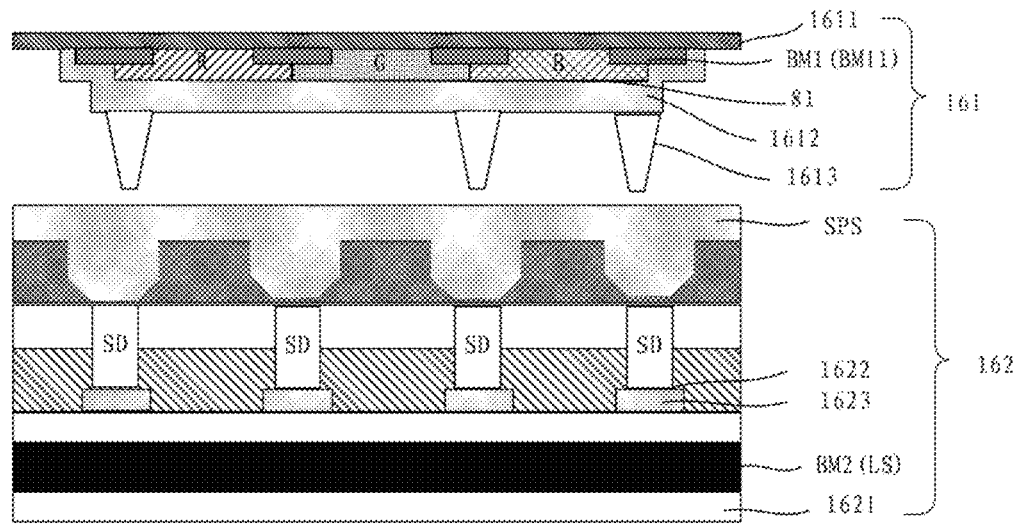
FIG. 17 schematically illustrates a cross-sectional view of another display panel in one or more embodiments of the present disclosure.
Figure 18:
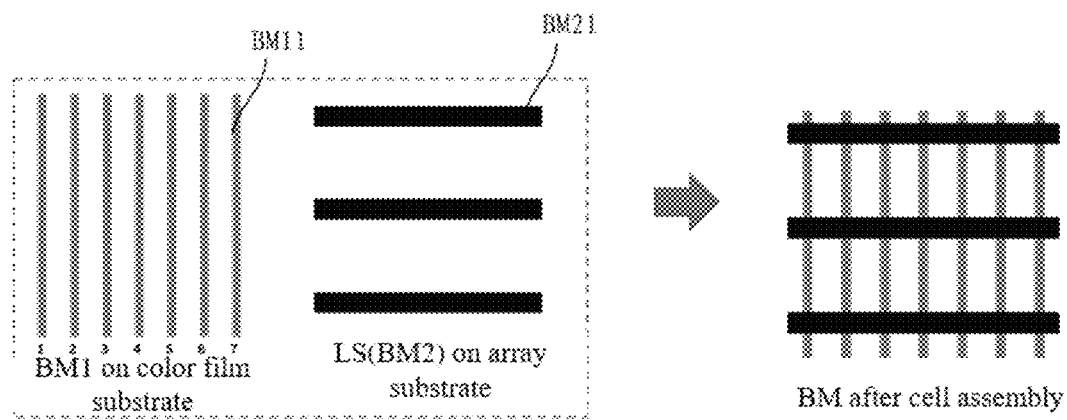
FIG. 18 schematically illustrates top views of arrangements of a first black matrix, a second black matrix, and a combined black matrix after cell assembly of the display panel shown in FIG. 17.

FIG. 17 schematically illustrates a cross-sectional view of another display panel 160 in one or more embodiments of the present disclosure; and FIG. 18 schematically illustrates top views of the arrangements of a first black matrix BM1, a second black matrix BM2, and a combined black matrix after cell assembly of the display panel 160 shown in FIG. 17.

As shown in FIGS. 17 and 18, the display panel 160 may include a color film substrate 161 and an array substrate 162. The color film substrate 161 may include a first substrate 1611 and a first black matrix BM1 located on the first substrate 1611 and may include a plurality of first black matrix strips BM11 extending in a first direction (e.g., a longitudinal direction, which may be the same direction as the extension of the data signal lines). The array substrate 162 may include a second substrate 1621 and a second black matrix BM2 located on the second substrate 1621 and may include a plurality of second black matrix strips BM21 extending in a second direction (e.g., a transverse direction, which may be the same direction as the extension of the gate signal lines) different from the first direction. In one or more embodiments of the present disclosure, after the color film substrate 161 and the array substrate 162 are cell assembled, the orthographic projection of the first black matrix BM1 on the first substrate 1611 and the orthographic projection of the second black matrix BM2 on the first substrate 1611 together may form a grid pattern, such that a combined black matrix may be formed.

In one or more embodiments of the present disclosure, the spacing between two adjacent ones of the plurality of first black matrix strips BM11 is less than the spacing between two adjacent ones of the plurality of second black matrix strips BM21, and the width of each first black matrix strip BM11 is less than the width of the second black matrix strip BM21.

In the embodiment shown in FIG. 17 and one or more other embodiments of the present disclosure, the color film substrate may further include a color resist layer 81 located in an opening of the first black matrix BM1, at least partially overlapping the plurality of first black matrix strips BM11 of the first black matrix BM1 and may include a first color resist R, a second color resist G, and a third color resist B; a planarization layer 1612 located on the color resist layer 81; and a plurality of spacers 1613 located on the planarization layer and configured to separate the color film substrate 161 and the array substrate 162 by a space for accommodating a liquid crystal layer.

In the embodiment shown in FIG. 17 and one or more other embodiments of the present disclosure, the array substrate 162 may further include a plurality of thin film transistors 1622 located on a side of the second black matrix BM2 away from the second substrate. Orthographic projections of the active layers 1623 of the thin film transistors 1622 on the second substrate 1621 may be within the orthographic projections of the plurality of second black matrix strips BM21 on the second substrate. With this configuration, the first black matrix BM1 may be used to separate the pixels formed by the first color resist R, the second color resist G, and the third color resist B. The plurality of second black matrix strips BM21 of the second black matrix BM2, in addition to shielding the spacers 1613 on the color film substrate 161 to avoid light leakage from the spacers, may also be multiplexed as the first shading portions LS1 to block light incident on the active layers 1623 and affect the effect of the active layers. In one or more embodiments of the present disclosure, as shown in FIG. 17, the array substrate 162 may further include a plurality of tabs SPS located on a side of the plurality of thin film transistors away from the second substrate, the plurality of tabs SPS being configured to be rested on by one or more of the plurality of spacers. The orthographic projections of the plurality of tabs SPS on the second substrate is within the orthographic projections of the plurality of second black matrix strips BM21 on the second substrate.

Figure 19:
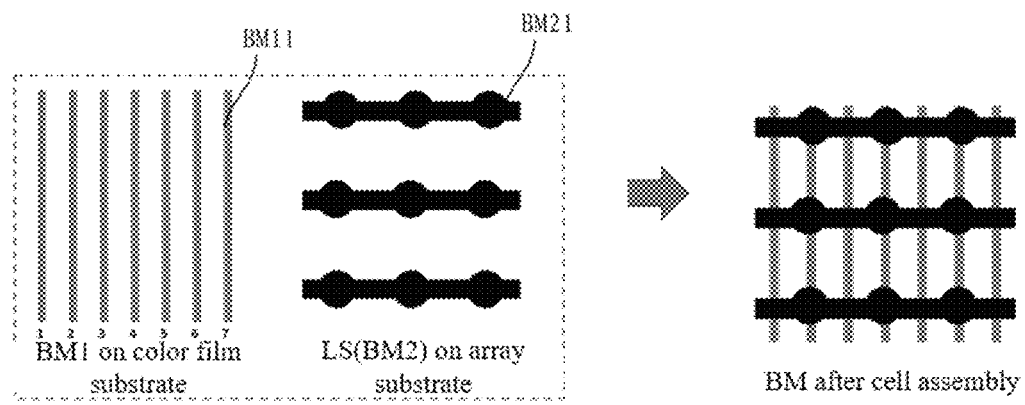
FIG. 19 schematically illustrates another top view of arrangements of the first black matrix, the second black matrix and the combined black matrix after cell assembly of the display panel shown in FIG. 17.

FIG. 19 schematically illustrates top view of other arrangements of a first black matrix BM1, a second black matrix BM2, and a combined black matrix after cell assembly of the display panel shown in FIG. 17. As shown in FIG. 19, the portions of the plurality of second black matrix strips BM21 that overlap the orthographic projections of the plurality of tabs may have a width greater than the width of the remaining portions of the plurality of second black matrix strips BM21. In this way, on the one hand, the second black matrix strips BM21 may shield the plurality of tabs and the plurality of spacers from light leakage from the tabs and spacers; on the other hand, setting the width of the remaining portions of the second black matrix strips BM21 to be smaller may improve the overall opening ratio of the display panel.

In one or more embodiments of the present disclosure, the plurality of first black matrix strips BM11 of the first black matrix BM1 may extend in the same direction as the plurality of data signal lines of the display panel 160 (i.e., both extend in the first direction), and the orthographic projections of the plurality of first black matrix strips BM11 on the second substrate 1621 may overlap with the orthographic projections of the plurality of data signal lines on the second substrate 1621. The plurality of second black matrix strips BM21 (first shading portions LS) of the second black matrix BM2 may extend in the same direction as the plurality of gate signal lines of the display panel 160 (i.e., both extend in the second direction), and the orthographic projections of the plurality of second black matrix strips BM21 on the second substrate 1621 may overlap with the orthographic projections of the plurality of gate signal lines on the second substrate 1621.

Example structures of the array substrate 162 used in the another display panel 160 in the embodiment shown in FIG. 17 are described in detail below in conjunction with FIGS. 22-24.

Figure 22:
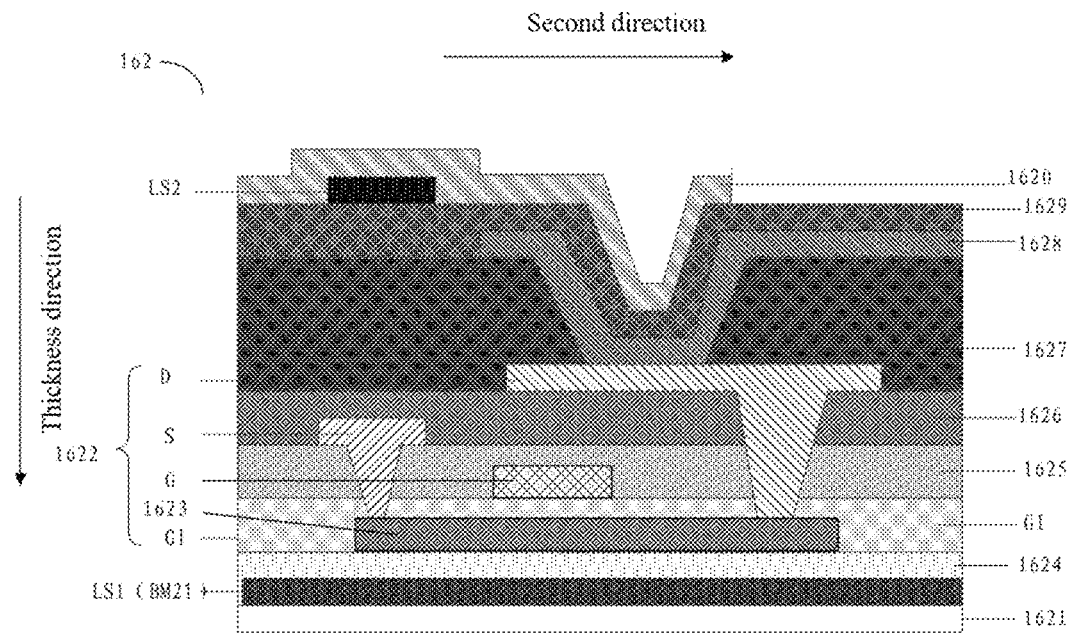
FIG. 22 schematically illustrates a cross-sectional view of an example array substrate of the another display panel in one or more embodiments of the present disclosure.

FIG. 22 schematically illustrates a cross-sectional view of an example array substrate 162 of the another display panel 160 in one or more embodiments of the present disclosure. As shown in FIG. 22, the example array substrate 162 of the display panel 160 may include a second substrate 1621; a plurality of first shading portions LS1 located on the second substrate 1621 and extending in a second direction, wherein the plurality of first shading portions LS1 may be multiplexed as the plurality of second black matrix strips BM21 which may form a combined black matrix together with the plurality of first black matrix strip BM11; and a plurality of thin film transistors 1622 located on the side of the plurality of first shading portions LS1 away from the second substrate 1621, wherein each thin film transistor 1622 may include an active layer 1623, a gate G, a source electrode S, a drain electrode D, and a gate insulating layer GI located between the gate G and the active layer 2223.

With continued reference to FIG. 22, the example array substrate 162 may further include a plurality of first electrodes 1628 located on a side of the plurality of thin film transistors 1622 away from the second substrate 1621, the plurality of first electrodes 1628 being electrically connected to the drain electrodes D of the plurality of thin film transistors 1623, respectively; a second electrode layer 1620 located on a side of the plurality of first electrodes 1628 away from the second substrate 1621 and electrically insulated from the plurality of first electrodes 1628; and a plurality of second shading portions LS2 in electrical contact with the second electrode layer 1620 and extending in the first direction. In the embodiment, the orthographic projections of the plurality of second shading portions LS2 on the second substrate 1621 overlap with the orthographic projections of the plurality of first black matrix strips BM11 of the color film substrate 161 on the second substrate 1621 and therefore also overlap with the orthographic projections of the plurality of data lines of the display panel on the second substrate 1621. In other words, the plurality of second shading portions LS2, the plurality of first black matrix strips BM11, and the plurality of data lines may overlap in the thickness direction of the display panel 160.

In one or more embodiments, the first electrode 1628 may be a pixel electrode, and the second electrode 1620 may be a common electrode. In this embodiment, the plurality of second shading portions LS2 may be located on a side of the second electrode 1620 closer to the second substrate 1621.

In one or more embodiments, the plurality of second shading portions LS2 may be a plurality of common leads (Com leads) and may be located in an area between adjacent subpixels (adjacent color resists) in the first direction. The plurality of second shading portions LS2 may block light leakage from the gap between adjacent subpixels and avoid crosstalk between subpixels adjacent in the first direction. Therefore, the display effect may be improved and the user experience may be enhanced.

In one or more embodiments, at least one of the plurality of second shading portions LS2 has disconnected positions (for example, 241 shown in FIG. 24), which may correspond to the positions where the plurality of tabs SPS or other support pillars are disposed so as to make spaces for disposing the SPS or other support pillars. In some embodiments, the material of the plurality of second shading portions LS2 includes a shading metal, such as molybdenum.

With continued reference to FIG. 22, the example array substrate 162 may further include a buffer layer 1624 between the plurality of first shading portions LS1 and the active layer 1623; a first interlayer insulation layer 1625 between the gate G and the source electrode S; a second interlayer insulation layer 1626 between the source electrode S and the drain electrode D; a planarization layer 1627 between the drain electrode D and the plurality of first electrodes; and a passivation layer 1629 between the plurality of first electrodes 1628 and the second electrode layer 1620. The source electrode S contacts the active layer 1623 through a via hole through the first interlayer insulating layer 1625 and the gate insulating layer GI, and the drain electrode D contacts the active layer 1623 through a via hole through the second interlayer insulating layer 1626, the first interlayer insulating layer 1625, and the gate insulating layer GI. The first electrode 1628 contacts the drain electrode D through a via hole through the planarization layer 1627.

Figure 23:
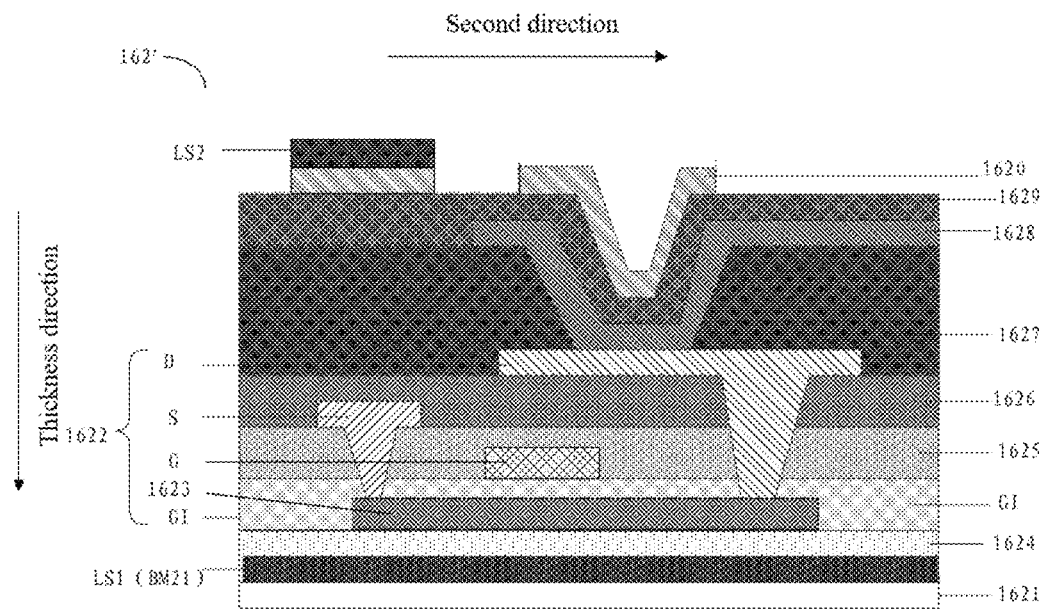
FIG. 23 schematically illustrates a cross-sectional view of another exemplary array substrate of another display panel in one or more embodiments of the present disclosure.

FIG. 23 schematically illustrates a cross-sectional view of another exemplary array substrate 162' of another display panel in one or more embodiments of the present disclosure. The another exemplary array substrate is substantially the same as the array substrate 162 shown in FIG. 22, except for the location of the second shading portion LS2 relative to the second electrode layer 1620. In the embodiment shown in FIG. 23, the second shading portion LS2 is located on the side of the second electrode layer 1620 away from the second substrate 1621.

Figure 24:
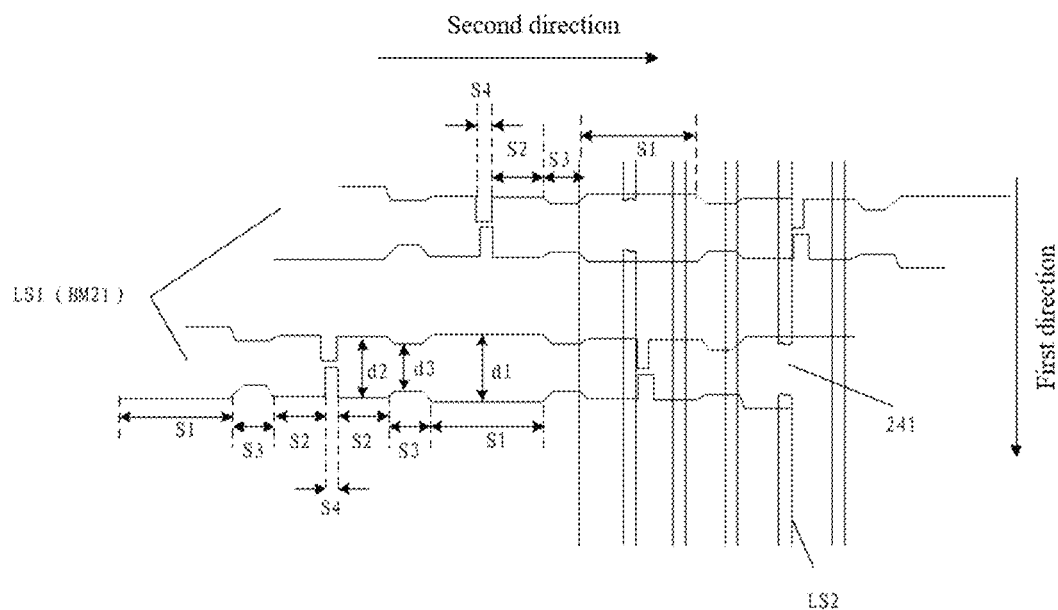
FIG. 24 schematically illustrates atop view of an exemplary array substrate of another display panel in one or more embodiments of the present disclosure.

FIG. 24 schematically illustrates a top view of an exemplary array substrate of another display panel in one or more embodiments of the present disclosure. For ease of illustration, only a plurality of second black matrix strips BM21 (a plurality of first shading portions LS1) and a plurality of second shading portions LS2 are shown in the top view of FIG. 24. As shown in FIG. 24, each second black matrix strip BM21 at least includes at least one first segment S1 having a first width d1, at least one second segment S2 having a second width d2, and at least one third segment S3 having a third width d3. Each second black matrix strip BM21 is formed by the at least one first segment, the at least one second segment, and the at least one third segment connected to one another. In one or more embodiments, the first width d1 is greater than the second width d2, and the second width d2 is greater than the third width d3. In an example embodiment, the first width d1 is 14.76±2.0 µm; the second width d2 is 11.23±2.0 µm; and the third width d3 is 9.05±2.0 µm.

In one or more embodiments of the present disclosure, the orthographic projection of the at least one first segment S1 on the second substrate 1621 may overlap with the orthographic projections of the plurality of tabs SPS on the second substrate 1621 to enable the second black matrix strips BM21 to block the plurality of tabs SPS to prevent light leakage from the tabs SPS.

In one or more embodiments of the present disclosure, by reasonably designing the correspondence between the first segment S1, the second segment S2, and the third segment S3 and the individual color resists of the color resist layer, the opening size of each pixel may be controlled, and thus the viewing comfort of the human eye may be improved.

Figure 25:
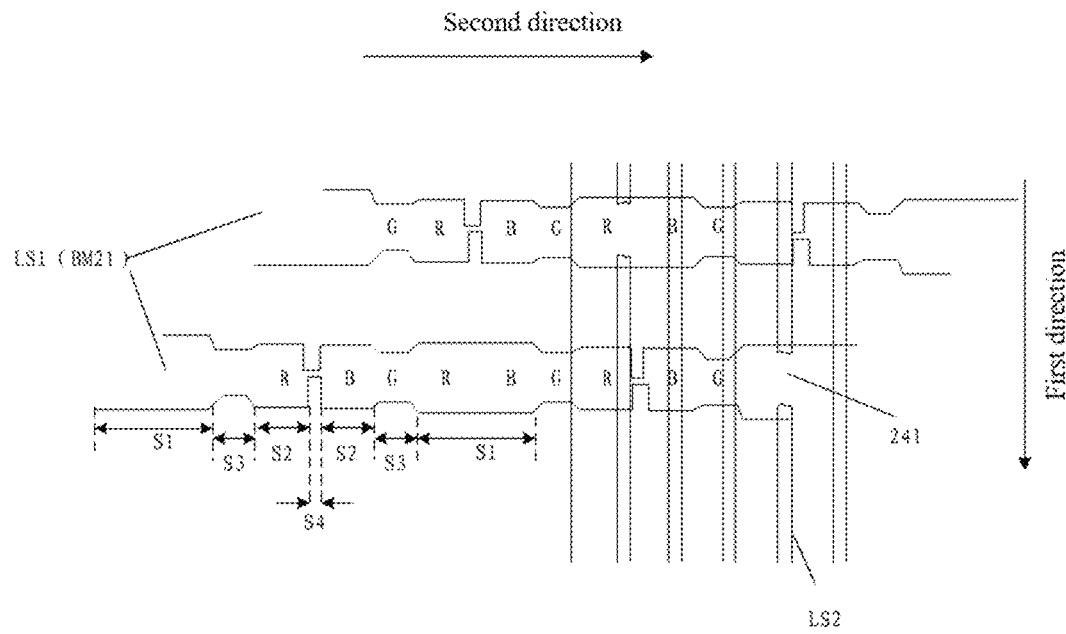
FIG. 25 schematically illustrates an example correspondence of the first segment S1, the second segment S2, and the third segment S3 with the respective color resists in the color resist layer.

FIG. 25 schematically illustrates an example correspondence of the first segment S1, the second segment S2, and the third segment S3 with the respective color resists of the color resist layer. As shown in FIG. 26, the orthographic projection of each first segment S1 on the second substrate 1621 may overlap with the orthographic projections of two adjacent color resists on the second substrate 1621. Specifically, each first segment S1 may have a length that spans two adjacent color resists in the second direction. In an example embodiment, the color resist layer may include a red color resist R, a blue color resist B, and a green color resist G arranged alternately in the second direction and extending in the first direction. In this case, each first segment S1 may overlap with the adjacent red color resist R and blue color resist B in the thickness direction of the display panel 160 (perpendicular to the first direction and the second direction).

With continued reference to FIG. 25, the orthographic projection of each second segment S2 on the second substrate 1621 may overlap with the orthographic projection of one color resist on the second substrate 1621, which is one of the two adjacent color resists described above. In an example embodiment, two adjacent second segments S2 may overlap with adjacent red color resist R and blue color resist B, respectively, in the thickness direction of the display panel. Specifically, each second segment may have a length that spans one color resist in the second direction, and each first segment S1 of one of the two adjacent second black matrix strips BM21 is aligned in the first direction with two second segments S2 of the other of the two adjacent second black matrix strips BM21.

With continued reference to FIG. 25, the orthographic projection of each third segment S3 on the second substrate 1621 may overlap with the orthographic projection of one color resist on the second substrate 1621 that is different from the two adjacent color resists described above. In an example embodiment, each third segment S3 may overlap with a green color resist G in the thickness direction of the display panel. Specifically, each third segment may have a length that spans one color resist in the second direction, and the third segment S3 of one of the two adjacent second black matrix strips 1621 is aligned with the third segment S3 of the other of the two adjacent second black matrix strips 6121.

By setting each second black matrix strip BM21 to have a non-uniform width in some embodiments of the present disclosure, the opening size of each pixel may be controlled, so that RGB sub-pixels may have different light transmission brightness. Considering the human eye comfort and sensitivity to RGB sub-pixels, the widths of the first segment S1, second segment S2 and third segment S3 of the second black matrix strip BM21 described herein may be set in such a way that the green sub-pixel has the largest light transmission area, and the blue and red sub-pixels have substantially the same light transmission area which is less than light transmission area of the green sub-pixel, so that the human eye may get a better viewing effect and experience without the influence of ambient light in the near-eye display.

In one or more embodiments of the present disclosure, at least one second black matrix strip BM21 of the plurality of second black matrix strips BM21 further has a fourth segment S4 between adjacent second segments S2 to space the adjacent second segments S2 apart. The fourth segment S4 has a fourth width d4 which is close to 0 µm, for example, the fourth width d4 is greater than 0 µm and less than 2 µm. In this embodiment, setting the fourth width d4 substantially equal to 0 may facilitate the discharge of static electricity, thereby facilitating process fabrication.

In this embodiment, the lap overlap between adjacent color resists of the first color resist R, the second color resist G, and the third color resist B and the overlap detection mark may be referred to the lap overlap and the overlap detection mark described in detail in one or more previous embodiments. As an example, the adjacent color resists of the first color resist R, the second color resist G and the third color resist B may be immediately adjacent and the overlap between them may be 0, but a margin may be allowed, for example, the margin may be ±0.6 µm. As an alternative embodiment, the adjacent color resists of the first color resist R, the second color resist G and the third color resist B may have a certain spacing therebetween, provided that the spacing satisfies the light leakage risk requirement.

In a still another aspect of the present disclosure, a method for preparing a color film substrate is further provided. In particular, the method may prepare at least one color film substrate according to the present disclosure, such as at least one color film substrate according to one or more of the embodiments disclosed in more detail above. Thus, for optional embodiments of the method, reference may be made to the embodiments of the color film substrate described above, as appropriate. The method may include the following steps, which may be performed in a given order or in a different order. In addition, additional method steps not listed may be provided. In addition, two or more or even all of the method steps may be performed at least partially simultaneously. Further, the method steps may be repeatedly performed twice or even more than twice.

In one or more embodiments of the present disclosure, the method for preparing the color film substrate may include: providing a base; forming a first black matrix BM1 on the base; and forming a second black matrix BM2, wherein the second black matrix BM2 overlaps with the first black matrix BM1, and at an overlapping position of the first black matrix BM1 and the second black matrix BM2, the second black matrix BM2 overlays the first black matrix BM1 in a direction perpendicular to the base, and wherein a size of an opening defined by either of the first black matrix BM1 and the second black matrix BM2 is larger than a size of an opening defined by the first black matrix BM1 and the second black matrix BM2 together.

Figure 20:
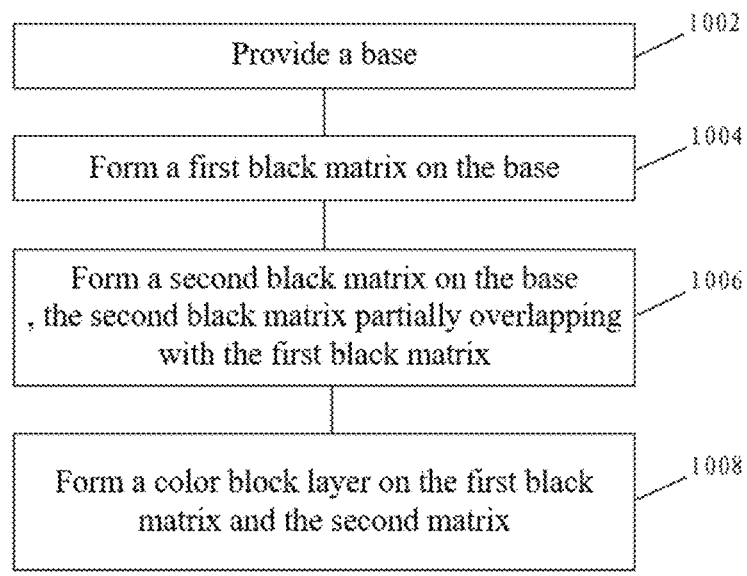
FIG. 20 schematically illustrates a flowchart of a method for preparing a color film substrate in one or more embodiments of the present disclosure.

FIG. 20 schematically illustrates a flow chart of a method for preparing a color film substrate in one or more embodiments of the present disclosure. As shown in FIG. 20, the method may include the following steps S1002, S1004, S1006, and S1008.

At step S1001, a base 301 is provided. The base 301 may include a semiconductor material such as monocrystalline silicon or polycrystalline silicon. In an alternative embodiment, the substrate may also be made of other hard or soft materials such as glass, plastic, etc.

In one or more embodiments of the present disclosure, at least one color film substrate may be prepared on the base (also referred to as the base layer). In the case where a single color film substrate is prepared on the base, the excess portion of the base other than the portion where the color film substrate is located may be cut off after the preparation is completed, thereby forming the color film substrate. In the case where a plurality of color film substrates are prepared on the base, the color film substrates on the base may be separated so that a plurality of individual color film substrates may be formed.

At step S1004, a first black matrix BM1 is formed on the base 301. The first black matrix BM1 may have any of the arrangements illustrated in FIG. 4A, FIG. 5A, FIG. 6A, and FIG. 7A or other arrangements. In some embodiments, the first black matrix BM1 may include at least a plurality of first black matrix strips BM11 extending in a first direction (FIG. 4A and FIG. 5A). In alternative embodiments, the first black matrix BM1 may include a plurality of first black matrix strips BM11 extending in the first direction and a plurality of fourth black matrix strips BM12 extending in the second direction (FIG. 6A and FIG. 7A).

The first black matrix BM1 may be formed by process steps such as gluing, exposure, developing, and baking. In the embodiment, to obtain a high PPI product, the width of the first black matrix strip BM11 extending in the first direction is generally relatively small, for example, less than 3.0 microns. However, the thinner the longitudinal black matrix strip is, the more likely it is to peel off during development. In order to avoid the first black matrix strip BM11 from peeling off, the size of the mask corresponding to the first black matrix strip BM11 may be set to have a deviation, for example, a deviation of 0.5 microns, and the glue may fully react by overexposure, thus being able to prevent the glue from peeling off at the position of the first black matrix strip BM11 and being able to reduce the BM remains in the channel between adjacent first black matrix strips BM11.

In some embodiments of the present disclosure, as already outlined above, a number of alignment marks (as shown in FIG. 13), alignment detection marks (as shown in FIG. 14), and/or overlap detection marks (such as the first reference mark 121 shown as a black hollow rectangle on the left in FIG. 12) may be formed on the base while forming the first black matrix BM1. The alignment mark may be adapted for alignment between the layers of the color film substrate when each layer is prepared; the alignment detection mark may be adapted to detect alignment deviations in the relative positions between the layers after each layer is formed; and the overlap detection mark is adapted to detect alignment deviations between at least one of the first color resist, the second color resist, and the third color resist subsequently formed and the black matrix strip having the same extension direction as the respective color resist.

In step 1006, a second black matrix BM2 is formed on the base 301, wherein the second black matrix BM2 is partially overlapped with the first black matrix BM1, and at an overlapping position of the first black matrix BM1 and the second black matrix BM2, the second black matrix BM2 overlays the first black matrix BM1 in a direction perpendicular to the base. In embodiments of the present disclosure, the second black matrix BM2 and the first black matrix BM1 together form a combined black matrix for the color film substrate. The second black matrix BM2 may be superimposed directly on the first black matrix BM1 At the overlapping position of the first black matrix BM1 and the second black matrix BM2. The first black matrix BM1 is co-planar with the second black matrix BM2 at the non-overlapping position of the first black matrix BM1 and the second black matrix BM2.

The second black matrix BM2 may have any of the arrangements illustrated in FIG. 4A, FIG. 5A, FIG. 6A, and FIG. 7A or other arrangements. In some embodiments, the second black matrix BM2 may include at least a plurality of second black matrix strips BM21 extending in the second direction (FIG. 4A). In an alternative embodiment, the second black matrix BM2 may include a plurality of second black matrix strips BM21 extending in the second direction and a plurality of third black matrix strips BM22 extending in the first direction (FIG. 5A and FIG. 6A). In yet another alternative embodiment, the second black matrix BM2 may include a plurality of third black matrix strips BM22 extending in the first direction (FIG. 7A).

The second black matrix BM2 may be formed by process steps such as gluing, exposure, developing, and baking. In the embodiment, the width of the second black matrix strip BM21 of the second black matrix BM2 extending in the second direction is typically greater than the width of the first black matrix strip BM11. In an example embodiment, the width of the second black matrix strip BM21 is typically 2-3 times the width of the first black matrix strip BM11, typically greater than 6.0 microns. Since the width of the second black matrix strip BM21 is wider, it is less likely to cause BM to peel off during development and, therefore, overexposure is not necessary. In the embodiment where the second black matrix BM2 has third black matrix strips BM22 extending in the first direction, in order to avoid the third black matrix strips BM22 from peeling off, the size of the mask corresponding to the third black matrix strips BM22 may be set to have a deviation, for example, a deviation of 0.5 microns, and the glue may fully react by overexposure, thus being able to prevent the glue from peeling off at the positions of the third black matrix strips BM22.

At step S1008, a color resist layer is formed on the first black matrix BM1 and the second black matrix BM2 such that the color resist layer is located in the opening defined by the combined black matrix (formed by the first black matrix BM1 and the second black matrix BM2) and at least partially overlaps with the plurality of black matrix strips extending in the first direction of the combined black matrix BM in a direction perpendicular to the base.

In some embodiments, the color resist layer may include a first color resist R, a second color resist G and a third color resist B arranged alternately in the second direction. In some embodiments, adjacent color resists of the first color resist R, the second color resist G and the third color resist B may overlay the plurality of black matrix strips extending in the first direction.

Figure 21:
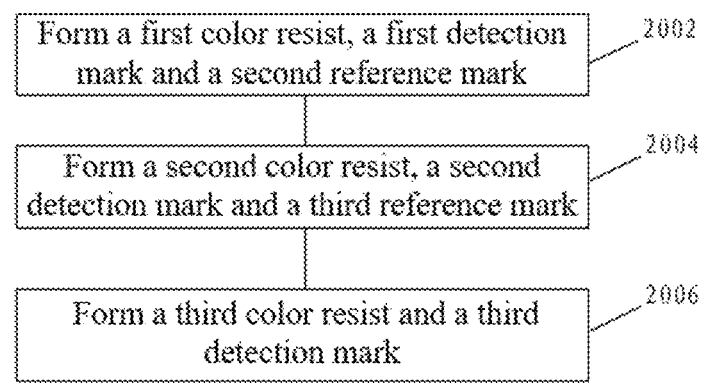
FIG. 21 schematically illustrates a flowchart for forming a color resist layer in accordance with one or more embodiments of the present disclosure.

FIG. 21 schematically illustrates a flowchart for forming a color-resist layer in accordance with one or more embodiments of the present disclosure. As shown in FIG. 21, forming the color resist layer may include at least steps S2002, S2004, and S2006.

At step S2002, the first color resist R, the first detection mark 122 and the second reference mark 123 are formed. The first detection mark 122 is adapted to compare its position with the position of the first reference mark 121 in order to determine the overlap deviation of the first color resist R relative to the first black matrix BM1, and the second reference mark 123 is adapted to detect the overlap deviations of the second color resist G with respect to the first color resist R and of the third color resist B with respect to the first color resist R. In the embodiment, the first color resist R may be a red color resist and the first detection mark 122 and the second reference mark 123 may be red.

At step S2004, the second color resist G, the second detection mark 124 and the third reference mark 125 are formed. The second detection mark 124 is adapted to compare its position with the position of the second reference mark 123 in order to determine the overlap deviation of the second color resist G with respect to the first color resist R, and the third reference mark 125 is adapted to detect the overlap deviation of the third color resist B with respect to the second color resist G. In the embodiment, the second color resist G may be a green resist and the second detection mark 124 and the third reference mark 125 may be green.

At step S2006, the third color resist B and the third detection mark 126 are formed. The third detection mark 126 is adapted to compare its position with to the positions of the second reference mark 123 and the third reference mark 125 in order to determine the overlap deviations of the third color resist with respect to the first color resist R and the second color resist G. In the embodiment, the third color resist B may be a blue color resist and the third detection mark 126 may also be blue.

Further details regarding the color layer, the overlap of the adjacent color resists of the color resist layer and the overlap detection mark may be referred to one or more embodiments described in detail previously for the color film substrate.

The flow chart depicted in this disclosure is only an example. Many variations of the flowchart or the steps described therein may exist without departing from the spirit of the present invention. For example, the steps described may be performed in a different order, or steps may be added, deleted, or modified. These variants are all considered to be part of the claimed protected aspects.

The foregoing description of the embodiment has been provided for purpose of illustration and description. It is not intended to be exhaustive or to limit the application. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the application, and all such modifications are included within the scope of the application.

What is claimed is:
1. A color film substrate comprising:
a substrate;
a first black matrix located on the substrate; and
a second black matrix partially overlapping with the first black matrix, wherein at an overlapping position of the first black matrix and the second black matrix, the second black matrix overlays the first black matrix in a direction perpendicular to the substrate, wherein a size of an opening defined by either of the first black matrix and the second black matrix is greater than a size of an opening defined by the first black matrix and the second black matrix together, and wherein an orthographic projection of the first black matrix on the substrate and an orthographic projection of the second black matrix on the substrate together form a grid pattern
wherein the first black matrix comprises at least a plurality of first black matrix strips extending in a first direction, and the second black matrix comprises at least a plurality of second black matrix strips extending in a second direction different from the first direction and intersecting with the plurality of first black matrix strips, and wherein the overlapping position of the first black matrix and the second black matrix comprises an intersection position of the plurality of first black matrix strips and the plurality of second black matrix strips, and wherein the first black matrix further comprises a plurality of fourth black matrix strips extending in the second direction and intersecting with the plurality of first black matrix strips, wherein the plurality of fourth black matrix strips are arranged dispersedly among the plurality of second black matrix strips such that there is at least one second black matrix strip between two adjacent fourth black matrix strips, and wherein each of the plurality of fourth black matrix strips and each of the plurality of second black matrix strips have a substantially same width and a width of each of the plurality of fourth black matrix strips is greater than a width of each of the plurality of first black matrix strips.

2. The color film substrate according to claim 1, wherein a spacing between two adjacent first black matrix strips of the plurality of first black matrix strips is less than a spacing between two adjacent second black matrix strips of the plurality of second black matrix strips, a width of each first black matrix strip is less than a width of each second black matrix strip, and a thickness of the first black matrix is greater than a thickness of a portion of the second black matrix that overlaps with the first black matrix, but less than a thickness of a portion of the second black matrix that does not overlap with the first black matrix.

3. The color film substrate according to claim 1, wherein the second black matrix further comprises a plurality of third black matrix strips extending in the first direction and intersecting with the plurality of second black matrix strips, wherein the plurality of third black matrix strips are arranged dispersedly among the plurality of first black matrix strips such that there is at least one first black matrix strip between two adjacent third black matrix strips, and wherein each of the plurality of first black matrix strips and each of the plurality of third black matrix strips have a substantially same width and a width of each of the plurality of third black matrix strips is less than a width of each of the plurality of second black matrix strips.

4. The color film substrate according to claim 3, wherein the plurality of third black matrix strips and the plurality of first black matrix strips are arranged alternately such that there is one first black matrix strip between two adjacent third black matrix strips, and wherein a distance from the one first black matrix strip and the third black matrix strip adjacent thereto is less than a distance between two adjacent second black matrix strips.

5. The color film substrate according to claim 1, wherein the plurality of fourth black matrix strips and the plurality of second black matrix strips are alternately arranged such that there is one second black matrix strip between two adjacent fourth black matrix strips.

6. The color film substrate according to claim 1, wherein a thickness of a portion of the second black matrix that overlaps with the first black matrix is less than a thickness of a portion of the second black matrix that does not overlap with the first black matrix.

7. The color film substrate according to claim 1, wherein the second black matrix is in direct contact with the first black matrix at the overlapping position of the second black matrix and the first black matrix, and wherein the second black matrix is coplanar with the first black matrix at a non-overlapping position of the first black matrix and the second black matrix.

8. The color film substrate according to claim 7, further comprising a color resist layer, wherein at least one of the first black matrix and the second black matrix comprises a plurality of black matrix strips extending in the first direction, and wherein the color resist layer is located in the opening defined by the first black matrix and the second black matrix together and overlaps at least partially with the plurality of black matrix strips in the direction perpendicular to the substrate.

9. The color film substrate according to claim 1, further comprising a color resist layer provided between the first black matrix and the second black matrix at the overlapping position.

10. The color film substrate according to claim 9, wherein at least one of the first black matrix and the second black matrix comprises a plurality of black matrix strips extending in the first direction, and wherein the color resist layer filling an opening defined by the first black matrix and overlapping at least partially with the plurality of black matrix strips in the direction perpendicular to the substrate.

11. The color film substrate according to claim 1, further comprising a color resist layer, wherein the color resist layer comprises a first color resist, a second color resist and a third color resist arranged alternately in the second direction, and wherein adjacent color resists of the first color resist, the second color resist and the third color resist have an overlap therebetween less than 0.6 μm.

* * * * *